United States Patent
Xie et al.

(10) Patent No.: US 12,022,498 B2
(45) Date of Patent: Jun. 25, 2024

(54) COMMUNICATION METHOD AND COMMUNICATIONS APPARATUS TO DETERMINE AVAILABLE FREQUENCY DOMAIN RESOURCE

(71) Applicant: HUAWEI TECHNOLOGIES CO., LTD., Guangdong (CN)

(72) Inventors: Xinqian Xie, Beijing (CN); Zhiheng Guo, Beijing (CN); Yongqiang Fei, Shenzhen (CN); Wenping Bi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 698 days.

(21) Appl. No.: 17/126,631

(22) Filed: Dec. 18, 2020

(65) Prior Publication Data
US 2021/0112562 A1   Apr. 15, 2021

Related U.S. Application Data

(63) Continuation of application No. PCT/CN2019/092362, filed on Jun. 21, 2019.

(30) Foreign Application Priority Data

Jun. 21, 2018   (CN) .................. 201810643004.X

(51) Int. Cl.
*H04W 72/53* (2023.01)
*H04L 5/00* (2006.01)
(Continued)

(52) U.S. Cl.
CPC ........... *H04W 72/53* (2023.01); *H04L 5/0039* (2013.01); *H04W 72/0453* (2013.01); *H04W 72/23* (2023.01)

(58) Field of Classification Search
None
See application file for complete search history.

(56) References Cited

U.S. PATENT DOCUMENTS

2013/0029606 A1   1/2013   Wang et al.
2013/0316711 A1   11/2013   Nakamura et al.
(Continued)

FOREIGN PATENT DOCUMENTS

CN   102754504 A   10/2012
CN   104348600 A   2/2015
(Continued)

OTHER PUBLICATIONS

NEC, Frequency and time resource allocation schemes for NR. 3GPP TSG-RAN WG1 Meeting #89, Hangzhou, P.R. China, May 15 19, 2017, R1-1707200, 5 pages.

*Primary Examiner* — Diane L Lo
(74) *Attorney, Agent, or Firm* — WOMBLE BOND DICKINSON (US) LLP

(57) ABSTRACT

This application relates to the field of communications technologies, and discloses a communication method and a communications apparatus. A terminal device receives first indication information from a network device, where the first indication information indicates an available frequency domain resource, in a bandwidth, which can be used by the terminal device to communicate with the network device. The bandwidth is one carrier bandwidth or one carrier bandwidth part. The available frequency domain resource includes a plurality of non-contiguous frequency domain resource groups, and each frequency domain resource group includes one or more contiguous frequency domain resource blocks. The terminal device determines the available frequency domain resource in the bandwidth based on the first indication information.

16 Claims, 6 Drawing Sheets

(51) Int. Cl.
    *H04W 72/0453*     (2023.01)
    *H04W 72/23*     (2023.01)

(56) References Cited

U.S. PATENT DOCUMENTS

| | | | | |
|---|---|---|---|---|
| 2018/0092002 | A1* | 3/2018 | Manolakos | H04W 72/04 |
| 2018/0310300 | A1* | 10/2018 | Lin | H04L 5/0053 |
| 2020/0021419 | A1* | 1/2020 | Taherzadeh Boroujeni | H04L 5/0053 |
| 2020/0059390 | A1* | 2/2020 | Zhang | H04L 1/1896 |

FOREIGN PATENT DOCUMENTS

| | | | |
|---|---|---|---|
| WO | 2015123870 | A1 | 8/2015 |
| WO | 2017010633 | A1 | 1/2017 |
| WO | 2018084790 | A1 | 5/2018 |
| WO | 2018104864 | A1 | 6/2018 |

* cited by examiner

COMMUNICATION METHOD AND COMMUNICATIONS APPARATUS TO DETERMINE AVAILABLE FREQUENCY DOMAIN RESOURCE

CROSS-REFERENCE TO RELATED APPLICATIONS

This application is a continuation of International Application No. PCT/CN2019/092362, filed on Jun. 21, 2019, which claims priority to Chinese Patent Application No. 201810643004.X, filed on Jun. 21, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In a 5th generation (5G) communications system, a plurality of standard bandwidths, for example, 5 MHz, 10 MHz, 15 MHz, 20 MHz, and 30 MHz, are defined. An operator needs to deploy a network based on a standard bandwidth defined in 5G. However, spectrums of some operators are non-contiguous, and these non-contiguous spectrums may also be referred to as discrete spectrums. The bandwidth of one segment of spectrum of the discrete spectrums owned by the operators may not be exactly one of the foregoing standard bandwidths. For example, as shown in FIG. 1, in a frequency band of 925.1 MHz to 955.1 MHz, bandwidths of discrete spectrums owned by operator A are respectively 5 MHz, bandwidth of 4.6 MHz, and 7.8 MHz. 4.6 MHz and 7.8 MHz cannot exactly comply with the standard bandwidths, a bandwidth of 4.6 MHz cannot be deployed in the 5G communications system, and a bandwidth of 7.8 MHz can only be deployed based on the standard bandwidth of 5 MHz, wasting 2.8 MHz spectrum resources.

Based on this, in the prior art, a solution is proposed that a large system bandwidth includes a plurality of discrete spectrums, and a network device and a terminal device configure and use a spectrum resource based on the large system bandwidth, thereby improving spectral efficiency. For example, as shown in FIG. 1, a system bandwidth of 30 MHz in which the frequency band from 925.1 MHz to 955.1 MHz is located is used as the large system bandwidth, the operator A applies an available frequency band in the system bandwidth of 30 MHz, and the network device allocates a resource to the terminal device in the available frequency band in the system bandwidth of 30 MHz. In addition, the network device notifies the terminal device of a reserved resource and a position of an available resource, and the reserved resource is a resource on which the terminal device cannot receive a downlink signal. In a downlink direction, the terminal device receives a signal in an entire system bandwidth by using a filter with a bandwidth of the system bandwidth, and obtains information needed by the terminal device from the received signal in the entire system bandwidth based on the obtained reserved resource and the position of the available resource.

However, the system bandwidth including the discrete spectrums may include a spectrum of another operator, and the spectrum of the another operator may include a signal sent by a network device of the another operator. In this case, the signal received by the terminal device in the system bandwidth may include the signal sent by the network device of the another operator. Consequently, the downlink signal of the terminal device is interfered by the signal sent by the network device of the another operator.

SUMMARY

Embodiments of this application provide a communication method and a communications apparatus, to resolve a problem of how a terminal device learns an available frequency domain resource when a system bandwidth including a discrete spectrum also includes a spectrum of another operator.

Specific technical solutions provided in the embodiments of this application are as follows.

According to a first aspect, a communication method is provided. The method is implemented in the following operations: A terminal device receives indication information from a network device. For ease of description, the indication information is referred to as first indication information, the first indication information indicates an available frequency domain resource, in a bandwidth, that can be used by the terminal device to communicate with the network device, and a frequency domain resource occupied by the terminal device (namely, a frequency domain resource allocated by the network device to the terminal device) belongs to the available frequency domain resource, where the bandwidth is one carrier bandwidth or one carrier bandwidth part, or the bandwidth is one system bandwidth, the available frequency domain resource includes a plurality of non-contiguous frequency domain resource groups, and the frequency domain resource group includes one or more contiguous frequency domain resource blocks. The terminal device determines the available frequency domain resource in the bandwidth based on the first indication information. In this way, the terminal device determines the available frequency domain resource in the bandwidth by using the indication information that is received from the network device, so that the terminal device can avoid interference. Further, because the terminal device learns the available frequency domain resource, a condition of receiving, based on the available frequency domain resource, a signal by using a narrowband filter with a proper value is qualified. When using the bandwidth including the plurality of non-contiguous frequency domain resource groups, the terminal device can filter out a signal of another system by using the narrowband filter with the proper value, thereby helping avoid interference of the signal of the another system, and improve data transmission quality.

In one embodiment, the first indication information includes a bit sequence, and a bit value in the bit sequence indicates the available frequency domain resource. For example, a bit value in the bit sequence indicates whether a frequency domain resource group belongs to the available frequency domain resource. Optionally, if the bit value is 1, it indicates that a frequency domain resource group corresponding to the bit value belongs to the available frequency domain resource, and the frequency domain resource group corresponding to a bit whose value is 1 in the bit sequence is the available frequency domain resource. Alternatively, if the bit value is 0, it indicates that the frequency domain resource group corresponding to the bit value belongs to the available frequency domain resource, and the frequency domain resource group corresponding to a bit whose value is 0 in the bit sequence is the available frequency domain resource. A method for indicating the available frequency domain resource is used, so that the terminal device can determine the available frequency domain resource in the bandwidth, in other words, determine an unavailable frequency domain resource in the bandwidth. In this way, the terminal device may perform signal processing based on the available frequency domain resource in the bandwidth, for example, set a filtering range based on the available frequency domain resource in the bandwidth, that is, set a bandwidth of a filter.

In one embodiment, the first indication information includes a plurality of first indication units, one first indication unit may also be considered as one field, the plurality of first indication units correspond to the plurality of non-contiguous frequency domain resource groups, and the first indication unit indicates the frequency domain resource group. An indication method of the available frequency domain resource is used, so that the terminal device can determine the available frequency domain resource in the bandwidth, in other words, determine an unavailable frequency domain resource in the bandwidth. In this way, the terminal device may perform signal processing based on the available frequency domain resource in the bandwidth, for example, set a filtering range based on the available frequency domain resource in the bandwidth, that is, set a bandwidth of a filter.

In one embodiment, the first indication unit indicates at least two of the following: a start position, a length, and an end position of the frequency domain resource group. An indication method of the available frequency domain resource is used, so that the terminal device can determine the available frequency domain resource in the bandwidth, in other words, determine an unavailable frequency domain resource in the bandwidth. In this way, the terminal device may perform signal processing based on the available frequency domain resource in the bandwidth, for example, set a filtering range based on the available frequency domain resource in the bandwidth, that is, set a bandwidth of a filter.

In one embodiment, content of the first indication unit is a frequency domain position of the frequency domain resource group, or the first indication unit is an index value, and there is a correspondence between the index value and the frequency domain position of the frequency domain resource group. The frequency domain position of the frequency domain resource group is indicated by using the index value. For example, the index value is a resource indication version. The frequency domain position of the frequency domain resource group may be at least two of the following: a start position, a length, and an end position of the frequency domain resource group. A method for indicating the available frequency domain resource is used, so that the terminal device can determine the available frequency domain resource in the bandwidth, in other words, determine an unavailable frequency domain resource in the bandwidth. In this way, the terminal device may perform signal processing based on the available frequency domain resource in the bandwidth, for example, set a filtering range based on the available frequency domain resource in the bandwidth, that is, set a bandwidth of a filter.

In one embodiment, the first indication information further indicates a reference frequency domain position of the frequency domain resource group. The reference frequency domain position includes at least one of a first frequency domain position and a second frequency domain position, where the first frequency domain position is lower than the start position of the frequency domain resource group, and the second frequency domain position is higher than the end position of the frequency domain resource group. Alternatively, the reference frequency domain position includes at least one of a first offset value and a second offset value, where the first offset value is an offset between the start position and the first frequency domain position, and the second offset value is an offset between the second frequency domain position and the end position. The first indication information indicates the reference frequency domain position of the frequency domain resource group, so that the terminal device can more precisely determine, based on the reference frequency domain position, a narrowband range in which filtering can be performed, and can more flexibly configure a bandwidth of a filter. For example, the terminal device may set the bandwidth of the filter with reference to a value of the frequency domain resource group and the reference frequency domain position, thereby lowering a requirement on the filter.

In one embodiment, the terminal device determines that a frequency domain resource, in the bandwidth, that is other than a frequency between the first frequency domain position and the second frequency domain position does not belong to the available frequency domain resource. Alternatively, the terminal device determines that a transmit and receive power at the first frequency domain position and/or the second frequency domain position is lower than a preset value. The transmit and receive power includes a transmit power and a receive power.

In one embodiment, the first indication information includes the bit sequence, the bit value in the bit sequence indicates the available frequency domain resource, the first indication information further includes a plurality of second indication units, and the second indication unit indicates the reference frequency domain position of the frequency domain resource group; or if the first indication information includes the plurality of first indication units, the plurality of first indication units correspond to the plurality of non-contiguous frequency domain resource groups, the first indication unit indicates the frequency domain resource group, and the first indication unit further indicates the reference frequency domain position of the frequency domain resource group.

In one embodiment, the terminal device receives second indication information from the network device, where the second indication information indicates a downlink resource; and the terminal device receives a downlink signal only on a downlink available frequency domain resource block, where the downlink available frequency domain resource block is a resource block belonging to the available frequency domain resource and the downlink resource.

In one embodiment, the downlink signal includes a downlink data signal, a downlink control signal, or a downlink reference signal.

In one embodiment, there are usually two indication manners for the second indication information. The first indication manner is a discrete frequency domain resource indication manner. To be specific, the second indication information includes one bit sequence, and each bit in the bit sequence correspondingly indicates X contiguous frequency domain resource blocks in the bandwidth. The second indication manner is a continuous frequency domain resource indication manner. To be specific, the second indication information includes one RIV, to indicate one segment of contiguous resource blocks in the bandwidth. In the foregoing manner of indicating a downlink resource by using the second indication information, the second indication information only needs to indicate the available downlink resource block, and does not need to indicate all frequency domain resource blocks in the bandwidth. Compared with the prior art, a quantity of bits of the second indication information can be reduced, overheads of downlink indication resources of the network device can be reduced, and complexity of processing downlink indication information by the terminal device can be reduced.

In one embodiment, the terminal device receives third indication information from the network device, where the third indication information indicates an uplink resource; and the terminal device sends an uplink signal on an available uplink frequency domain resource block, where the available uplink frequency domain resource block is a resource block belonging to the available frequency domain resource and the uplink resource.

In one embodiment, the uplink signal includes an uplink data signal, an uplink control signal, or an uplink reference signal.

In one embodiment, if the available downlink frequency domain resource block is located in the plurality of frequency domain resource groups, the terminal device receives the downlink signal on the plurality of frequency domain resource groups by using a plurality of radio frequency units; or if the available uplink frequency domain resource block is located in the plurality of frequency domain resource groups, the terminal device sends the uplink signal on the plurality of frequency domain resource groups by using a plurality of radio frequency units; and the plurality of radio frequency units correspond to the plurality of frequency domain resource groups.

In one embodiment, if the available downlink frequency domain resource block is located in the plurality of frequency domain resource groups, the terminal device processes, by using a plurality of filters, the downlink signal received on the plurality of frequency domain resource groups; or if the available uplink frequency domain resource block is located in the plurality of frequency domain resource groups, the terminal device processes, by using a plurality of filters, the uplink signal sent on the plurality of frequency domain resource groups; and the plurality of filters correspond to the plurality of frequency domain resource groups.

In one embodiment, if the downlink signal is a downlink data signal, the downlink data signal includes at least one first transport block, and the available downlink frequency domain resource block is located in the plurality of frequency domain resource groups, any first transport block is carried on all the available downlink frequency domain resource blocks located in the plurality of frequency domain resource groups.

In one embodiment, if the uplink signal is an uplink data signal, the uplink data signal includes at least one second transport block, and the available uplink frequency domain resource block belongs to the plurality of frequency domain resource groups, any second transport block is carried on all the available uplink frequency domain resource blocks located in the plurality of frequency domain resource groups.

In one embodiment, the terminal device determines an unavailable frequency domain resource in the bandwidth, where the unavailable frequency domain resource cannot be used by the terminal device to communicate with the network device.

According to a second aspect, a communication method is provided. The method is implemented in the following operations: A terminal device receives first indication information from a network device, where the first indication information indicates an unavailable frequency domain resource, in a bandwidth, that cannot be used by the terminal device to communicate with the network device, where the bandwidth is one carrier bandwidth or one carrier bandwidth part, the unavailable frequency domain resource includes a plurality of non-contiguous frequency domain resource groups, and the frequency domain resource group includes one or more contiguous frequency domain resource blocks. The terminal device determines the unavailable frequency domain resource in the bandwidth based on the first indication information. In this way, the terminal device determines the unavailable frequency domain resource in the bandwidth by using the indication information that is received from the network device, so that the terminal device can avoid interference. Further, because the terminal device learns the unavailable frequency domain resource, a condition of receiving, based on the bandwidth and the unavailable frequency domain resource, a signal by using a narrowband filter with a proper value is qualified. When using the bandwidth including the plurality of non-contiguous frequency domain resource groups, the terminal device can filter out a signal of another system by using the narrowband filter with the proper value, thereby helping avoid interference of the signal of the another system, and improve data transmission quality.

In one embodiment, the first indication information includes a bit sequence, and a bit value in the bit sequence indicates the unavailable frequency domain resource. For example, a bit value in the bit sequence indicates whether a frequency domain resource group belongs to the unavailable frequency domain resource. In one embodiment, if the bit value is 1, it indicates that a frequency domain resource group corresponding to the bit value belongs to the unavailable frequency domain resource, and the frequency domain resource group corresponding to a bit whose value is 1 in the bit sequence is the unavailable frequency domain resource. Alternatively, if the bit value is 0, it indicates that the frequency domain resource group corresponding to the bit value belongs to the unavailable frequency domain resource, and the frequency domain resource group corresponding to a bit whose value is 0 in the bit sequence is the unavailable frequency domain resource. A method for indicating the unavailable frequency domain resource is used, so that the terminal device can determine the unavailable frequency domain resource in the bandwidth, in other words, determine an available frequency domain resource in the bandwidth. In this way, the terminal device may perform signal processing based on the unavailable frequency domain resource in the bandwidth, for example, remove a value of the unavailable frequency domain resource in the bandwidth, and set one or more narrowband filtering ranges based on a remaining value.

In one embodiment, the first indication information includes a plurality of first indication units, one first indication unit may also be considered as one field, the plurality of first indication units correspond to the plurality of non-contiguous frequency domain resource groups, the frequency domain resource group belongs to the unavailable frequency domain resource, and the first indication unit indicates the frequency domain resource group. A method for indicating the unavailable frequency domain resource is used, so that the terminal device can determine the unavailable frequency domain resource in the bandwidth, in other words, determine an available frequency domain resource in the bandwidth. In this way, the terminal device may perform signal processing based on the unavailable frequency domain resource in the bandwidth, for example, remove a value of the unavailable frequency domain resource in the bandwidth, and set one or more narrowband filtering ranges based on a remaining value.

In one embodiment, the first indication unit indicates at least two of the following: a start position, a length, and an end position of the frequency domain resource group. A method for indicating the unavailable frequency domain resource is used, so that the terminal device can determine the unavailable frequency domain resource in the bandwidth, in other words, determine an available frequency domain resource in the bandwidth. In this way, the terminal device may perform signal processing based on the unavailable frequency domain resource in the bandwidth, for example, remove a value of the unavailable frequency domain resource in the bandwidth, and set one or more narrowband filtering ranges based on a remaining value.

In one embodiment, content of the first indication unit is a frequency domain position of the frequency domain resource group, or the first indication unit is an index value, and there is a correspondence between the index value and the frequency domain position of the frequency domain resource group. The frequency domain position of the frequency domain resource group is indicated by using the index value. For example, the index value is a resource indication version. The frequency domain resource group belongs to the unavailable frequency domain resource, and the frequency domain position of the frequency domain resource group may be at least two of the following: a start position, a length, and an end position of the frequency domain resource group. A method for indicating the unavailable frequency domain resource is used, so that the terminal device can determine the unavailable frequency domain resource in the bandwidth, in other words, determine an unavailable frequency domain resource in the bandwidth. In this way, the terminal device may perform signal processing based on the unavailable frequency domain resource in the bandwidth, for example, remove a value of the unavailable frequency domain resource in the bandwidth, and set one or more narrowband filtering ranges based on a remaining value.

In one embodiment, the first indication information further indicates a reference frequency domain position of the frequency domain resource group, and the frequency domain resource group belongs to the unavailable frequency domain resource. The reference frequency domain position includes at least one of a first frequency domain position and a second frequency domain position, where the first frequency domain position is lower than the start position of the frequency domain resource group, and the second frequency domain position is higher than the end position of the frequency domain resource group. Alternatively, the reference frequency domain position includes at least one of a first offset value and a second offset value, where the first offset value is an offset between the start position and the first frequency domain position, and the second offset value is an offset between the second frequency domain position and the end position. The first indication information indicates the reference frequency domain position of the frequency domain resource group, so that the terminal device can more precisely determine, based on the reference frequency domain position, a narrowband range in which filtering can be performed, and can more flexibly configure a bandwidth of a filter. For example, the terminal device may set the bandwidth of the filter with reference to a value of the frequency domain resource group and the reference frequency domain position, thereby lowering a requirement on the filter.

In one embodiment, if the first indication information includes a first field and does not include a second field. In other words, the first indication information includes a field indicating a frequency domain resource and does not include a field indicating a time domain resource. In this way, the first field indicates the unavailable frequency domain resource in the bandwidth. The first field indicates the frequency domain resource on which the terminal device cannot receive a downlink signal, and the second field indicates the time domain resource on which the terminal device cannot receive a downlink signal.

In one embodiment, the terminal device may further determine the unavailable frequency domain resource in the bandwidth in the following manner: The terminal device determines whether the first indication information includes the second field; and if the first indication information does not include the second field, the terminal device obtains the first field in the first indication information, and determines the unavailable frequency domain resource in the bandwidth based on the first field.

In one embodiment, the unavailable frequency domain resource indicated by the first field is applicable to uplink communication, downlink communication, or both uplink and downlink communication.

In one embodiment, the first indication information includes the bit sequence, the bit value in the bit sequence indicates the unavailable frequency domain resource, the first indication information further includes a plurality of second indication units, and the second indication unit indicates the reference frequency domain position of the frequency domain resource group; or if the first indication information includes the plurality of first indication units, the plurality of first indication units correspond to the plurality of non-contiguous frequency domain resource groups, the first indication unit indicates the frequency domain resource group, and the first indication unit further indicates the reference frequency domain position of the frequency domain resource group.

In one embodiment, the terminal device receives second indication information from the network device, where the second indication information indicates a downlink resource; and the terminal device receives a downlink signal only on a downlink available frequency domain resource block, where the downlink available frequency domain resource block is a resource block belonging to the available frequency domain resource and the downlink resource.

In one embodiment, the downlink signal includes a downlink data signal, a downlink control signal, or a downlink reference signal.

In one embodiment, there are usually two indication manners for the second indication information. The first indication manner is a discrete frequency domain resource indication manner. To be specific, the second indication information includes one bit sequence, and each bit in the bit sequence correspondingly indicates X contiguous frequency domain resource blocks in the bandwidth. The second indication manner is a continuous frequency domain resource indication manner. To be specific, the second indication information includes one RIV, to indicate one segment of contiguous resource blocks in the bandwidth. In the foregoing manner of indicating a downlink resource by using the second indication information, the second indication information only needs to indicate the available downlink resource block, and does not need to indicate all frequency domain resource blocks in the bandwidth. Compared with the prior art, a quantity of bits of the second indication information can be reduced, overheads of downlink indication resources of the network device can be reduced, and complexity of processing downlink indication information by the terminal device can be reduced.

In one embodiment, the terminal device receives third indication information from the network device, where the third indication information indicates an uplink resource; and the terminal device sends an uplink signal on an available uplink frequency domain resource block, where the unavailable uplink frequency domain resource block is a resource block belonging to the unavailable frequency domain resource and the uplink resource.

In one embodiment, the uplink signal includes an uplink data signal, an uplink control signal, or an uplink reference signal.

In one embodiment, if the available downlink frequency domain resource block is located in the plurality of frequency domain resource groups, the terminal device receives the downlink signal on the plurality of frequency domain resource groups by using a plurality of radio frequency units; or if the available uplink frequency domain resource block is located in the plurality of frequency domain resource groups, the terminal device sends the uplink signal on the plurality of frequency domain resource groups by using a plurality of radio frequency units; and the plurality of radio frequency units correspond to the plurality of frequency domain resource groups.

In one embodiment, if the available downlink frequency domain resource block is located in the plurality of frequency domain resource groups, the terminal device processes, by using a plurality of filters, the downlink signal received on the plurality of frequency domain resource groups; or if the available uplink frequency domain resource block is located in the plurality of frequency domain resource groups, the terminal device processes, by using a plurality of filters, the uplink signal sent on the plurality of frequency domain resource groups; and the plurality of filters correspond to the plurality of frequency domain resource groups.

In one embodiment, if the downlink signal is a downlink data signal, the downlink data signal includes at least one first transport block, and the available downlink frequency domain resource block is located in the plurality of frequency domain resource groups, any first transport block is carried on all the available downlink frequency domain resource blocks located in the plurality of frequency domain resource groups.

In one embodiment, if the uplink signal is an uplink data signal, the uplink data signal includes at least one second transport block, and the available uplink frequency domain resource block belongs to the plurality of frequency domain resource groups, any second transport block is carried on all the available uplink frequency domain resource blocks located in the plurality of frequency domain resource groups.

According to a third aspect, a communication method is provided. The method is implemented in the following operations: A terminal device receives first indication information from a network device, where the first indication information indicates a group number of a bandwidth part in a bandwidth, and the terminal device determines the group number of the bandwidth part based on the first indication information. In this way, the terminal device may determine an available frequency domain resource and an unavailable frequency domain resource according to the group number of the bandwidth part, and bandwidth parts in a same group may be processed by using a narrowband filter, thereby avoiding uplink and downlink interference.

In one embodiment, the terminal device determines the available frequency domain resource and/or the unavailable frequency domain resource according to the group number of the bandwidth part. Specifically, a frequency domain resource between bandwidth parts with a same group number is the available frequency domain resource, and a frequency domain resource between bandwidth parts with different group numbers is the unavailable frequency domain resource.

In one embodiment, the first indication information includes a plurality of fields, the plurality of fields indicate bandwidth parts of a plurality of groups, and one field indicates a bandwidth part of one group. The bandwidth parts in the same group are contiguous and belong to a same frequency domain resource group, and bandwidth parts in different groups do not overlap and belong to different frequency domain resource groups.

According to a fourth aspect, a communication method is provided. The method is implemented in the following operations: A network device generates first indication information; and the network device sends the first indication information to a terminal device, where the first indication information indicates an available frequency domain resource, in a bandwidth, that can be used by the terminal device to communicate with the network device, where the bandwidth is one carrier bandwidth or one carrier bandwidth part, the available frequency domain resource includes a plurality of non-contiguous frequency domain resource groups, and the frequency domain resource group includes one or more contiguous frequency domain resource blocks. In this way, the network device indicates the available frequency domain resource in the bandwidth to the terminal device, and the terminal device can determine the available frequency domain resource in the bandwidth, so that the terminal device can avoid interference. Further, because the terminal device learns the available frequency domain resource, a condition of receiving, based on the available frequency domain resource, a signal by using a narrowband filter with a proper value is met. When using the bandwidth including the plurality of non-contiguous frequency domain resource groups, the terminal device can filter out a signal of another system by using the narrowband filter with the proper value, thereby helping avoid interference of the signal of the another system, and improve data transmission quality.

In one embodiment, the first indication information includes a bit sequence, and a bit value in the bit sequence indicates the available frequency domain resource. For example, a bit value in the bit sequence indicates whether a frequency domain resource group belongs to the available frequency domain resource. In one embodiment, if the bit value is 1, it indicates that a frequency domain resource group corresponding to the bit value belongs to the available frequency domain resource, and the frequency domain resource group corresponding to a bit whose value is 1 in the bit sequence is the available frequency domain resource. Alternatively, if the bit value is 0, it indicates that the frequency domain resource group corresponding to the bit value belongs to the available frequency domain resource, and the frequency domain resource group corresponding to a bit whose value is 0 in the bit sequence is the available frequency domain resource. A method for indicating the available frequency domain resource is used, so that the terminal device can determine the available frequency domain resource in the bandwidth, in other words, determine an unavailable frequency domain resource in the bandwidth. In this way, the terminal device may have a condition for performing signal processing based on the available frequency domain resource in the bandwidth, for example, set a filtering range based on the available frequency domain resource in the bandwidth, that is, set a bandwidth of a filter.

In one embodiment, the first indication information includes a plurality of first indication units, one first indication unit may also be considered as one field, the plurality of first indication units correspond to the plurality of non-contiguous frequency domain resource groups, and the first indication unit indicates the frequency domain resource group. A method for indicating the available frequency domain resource is used, so that the terminal device can determine the available frequency domain resource in the bandwidth, in other words, determine an unavailable frequency domain resource in the bandwidth. In this way, the terminal device may have a condition for performing signal processing based on the available frequency domain resource in the bandwidth, for example, set a filtering range based on the available frequency domain resource in the bandwidth, that is, set a bandwidth of a filter.

In one embodiment, the first indication unit indicates at least two of the following: a start position, a length, and an end position of the frequency domain resource group. A method for indicating the available frequency domain resource is used, so that the terminal device can determine the available frequency domain resource in the bandwidth, in other words, determine an unavailable frequency domain resource in the bandwidth. In this way, the terminal device may have a condition for performing signal processing based on the available frequency domain resource in the bandwidth, for example, set a filtering range based on the available frequency domain resource in the bandwidth, that is, set a bandwidth of a filter.

In one embodiment, content of the first indication unit is a frequency domain position of the frequency domain resource group, or the first indication unit is an index value, and there is a correspondence between the index value and the frequency domain position of the frequency domain resource group. The frequency domain position of the frequency domain resource group is indicated by using the index value. For example, the index value is a resource indication version. The frequency domain position of the frequency domain resource group may be at least two of the following: a start position, a length, and an end position of the frequency domain resource group. A method for indicating the available frequency domain resource is used, so that the terminal device can determine the available frequency domain resource in the bandwidth, in other words, determine an unavailable frequency domain resource in the bandwidth. In this way, the terminal device may have a condition for performing signal processing based on the available frequency domain resource in the bandwidth, for example, set a filtering range based on the available frequency domain resource in the bandwidth, that is, set a bandwidth of a filter.

In one embodiment, the first indication information further indicates a reference frequency domain position of the frequency domain resource group. The reference frequency domain position includes at least one of a first frequency domain position and a second frequency domain position, where the first frequency domain position is lower than the start position of the frequency domain resource group, and the second frequency domain position is higher than the end position of the frequency domain resource group. Alternatively, the reference frequency domain position includes at least one of a first offset value and a second offset value, where the first offset value is an offset between the start position and the first frequency domain position, and the second offset value is an offset between the second frequency domain position and the end position. The first indication information indicates the reference frequency domain position of the frequency domain resource group, so that the terminal device can more precisely determine, based on the reference frequency domain position, a narrowband range in which filtering can be performed, and can more flexibly configure a bandwidth of a filter. For example, the terminal device may set the bandwidth of the filter with reference to a value of the frequency domain resource group and the reference frequency domain position, thereby lowering a requirement on the filter.

In one embodiment, the first indication information includes the bit sequence, the bit value in the bit sequence indicates the available frequency domain resource, the first indication information further includes a plurality of second indication units, and the second indication unit indicates the reference frequency domain position of the frequency domain resource group; or if the first indication information includes the plurality of first indication units, the plurality of first indication units correspond to the plurality of non-contiguous frequency domain resource groups, the first indication unit indicates the frequency domain resource group, and the first indication unit further indicates the reference frequency domain position of the frequency domain resource group.

According to a fifth aspect, a communication method is provided. The method is implemented in the following operations: A network device generates first indication information; and the network device sends the first indication information to a terminal device, where the first indication information indicates an unavailable frequency domain resource, in a bandwidth, that can be used by the terminal device to communicate with the network device, where the bandwidth is one carrier bandwidth or one carrier bandwidth part, the unavailable frequency domain resource includes a plurality of non-contiguous frequency domain resource groups, and the frequency domain resource group includes one or more contiguous frequency domain resource blocks. In this way, the network device indicates the unavailable frequency domain resource in the bandwidth to the terminal device, and the terminal device can determine the unavailable frequency domain resource in the bandwidth, so that the terminal device can avoid interference. Further, because the terminal device learns the unavailable frequency domain resource, a condition of receiving, based on the bandwidth and the unavailable frequency domain resource, a signal by using a narrowband filter with a proper value is met. When using the bandwidth including the plurality of non-contiguous frequency domain resource groups, the terminal device can filter out a signal of another system by using the narrowband filter with the proper value, thereby helping avoid interference of the signal of the another system, and improve data transmission quality.

In one embodiment, the first indication information includes a bit sequence, and a bit value in the bit sequence indicates the unavailable frequency domain resource. For example, a bit value in the bit sequence indicates whether a frequency domain resource group belongs to the unavailable frequency domain resource. In one embodiment, if the bit value is 1, it indicates that a frequency domain resource group corresponding to the bit value belongs to the unavailable frequency domain resource, and the frequency domain resource group corresponding to a bit whose value is 1 in the bit sequence is the unavailable frequency domain resource. Alternatively, if the bit value is 0, it indicates that the frequency domain resource group corresponding to the bit value belongs to the unavailable frequency domain resource, and the frequency domain resource group corresponding to a bit whose value is 0 in the bit sequence is the unavailable frequency domain resource. A method for indicating the unavailable frequency domain resource is used, so that the terminal device can determine the unavailable frequency domain resource in the bandwidth, in other words, determine an available frequency domain resource in the bandwidth. In this way, the terminal device may perform signal processing based on the unavailable frequency domain resource in the bandwidth, for example, remove a value of the unavailable frequency domain resource in the bandwidth, and set one or more narrowband filtering ranges based on a remaining value.

In one embodiment, the first indication information includes a plurality of first indication units, one first indication unit may also be considered as one field, the plurality of first indication units correspond to the plurality of non-contiguous frequency domain resource groups, the frequency domain resource group belongs to the unavailable frequency domain resource, and the first indication unit indicates the frequency domain resource group. A method for indicating the unavailable frequency domain resource is used, so that the terminal device can determine the unavailable frequency domain resource in the bandwidth, in other words, determine an available frequency domain resource in the bandwidth. In this way, the terminal device may perform signal processing based on the unavailable frequency domain resource in the bandwidth, for example, remove a value of the unavailable frequency domain resource in the bandwidth, and set one or more narrowband filtering ranges based on a remaining value.

In one embodiment, the first indication unit indicates at least two of the following: a start position, a length, and an end position of the frequency domain resource group. A method for indicating the unavailable frequency domain resource is used, so that the terminal device can determine the unavailable frequency domain resource in the bandwidth, in other words, determine an unavailable frequency domain resource in the bandwidth. In this way, the terminal device may perform signal processing based on the unavailable frequency domain resource in the bandwidth, for example, remove a value of the unavailable frequency domain resource in the bandwidth, and set one or more narrowband filtering ranges based on a remaining value.

In one embodiment, content of the first indication unit is a frequency domain position of the frequency domain resource group, or the first indication unit is an index value, and there is a correspondence between the index value and the frequency domain position of the frequency domain resource group. The frequency domain position of the frequency domain resource group is indicated by using the index value. For example, the index value is a resource indication version. The frequency domain resource group belongs to the unavailable frequency domain resource, and the frequency domain position of the frequency domain resource group may be at least two of the following: a start position, a length, and an end position of the frequency domain resource group. A method for indicating the unavailable frequency domain resource is used, so that the terminal device can determine the unavailable frequency domain resource in the bandwidth, in other words, determine an unavailable frequency domain resource in the bandwidth. In this way, the terminal device may perform signal processing based on the unavailable frequency domain resource in the bandwidth, for example, remove a value of the unavailable frequency domain resource in the bandwidth, and set one or more narrowband filtering ranges based on a remaining value.

In one embodiment, the first indication information further indicates a reference frequency domain position of the frequency domain resource group, and the frequency domain resource group belongs to the unavailable frequency domain resource. The reference frequency domain position includes at least one of a first frequency domain position and a second frequency domain position, where the first frequency domain position is higher than the start position of the frequency domain resource group, the second frequency domain position is lower than the end position of the frequency domain resource group, and the second frequency domain position is higher than the first frequency domain position. Alternatively, the reference frequency domain position includes at least one of a first offset value and a second offset value, where the first offset value is an offset between the start position and the first frequency domain position, and the second offset value is an offset between the second frequency domain position and the end position. The first indication information indicates the reference frequency domain position of the frequency domain resource group, so that the terminal device can more precisely determine, based on the reference frequency domain position, a narrowband range in which filtering can be performed, and can more flexibly configure a bandwidth of a filter. For example, the terminal device may set the bandwidth of the filter with reference to a value of the frequency domain resource group and the reference frequency domain position, thereby lowering a requirement on the filter.

In one embodiment, the first indication information includes the bit sequence, the bit value in the bit sequence indicates the unavailable frequency domain resource, the first indication information further includes a plurality of second indication units, and the second indication unit indicates the reference frequency domain position of the frequency domain resource group; or if the first indication information includes the plurality of first indication units, the plurality of first indication units correspond to the plurality of non-contiguous frequency domain resource groups, the first indication unit indicates the frequency domain resource group, and the first indication unit further indicates the reference frequency domain position of the frequency domain resource group.

According to a sixth aspect, a communication method is provided. The method is implemented in the following operations: A network device generates first indication information; and the network device sends the first indication information to a terminal device, where the first indication information indicates a group number of a bandwidth part in a bandwidth. In this way, the network device may indicate the group number of the bandwidth part to the terminal device, so that the terminal device determines an available frequency domain resource and an unavailable frequency domain resource, and bandwidth parts in a same group may be processed by using a narrowband filter, thereby avoiding uplink and downlink interference.

In one embodiment, a frequency domain resource between bandwidth parts with a same group number is the available frequency domain resource, and a frequency domain resource between bandwidth parts with different group numbers is the unavailable frequency domain resource.

In one embodiment, the first indication information includes a plurality of fields, the plurality of fields indicate bandwidth parts of a plurality of groups, and one field indicates a bandwidth part of one group. The bandwidth parts in the same group are contiguous and belong to a same frequency domain resource group, and bandwidth parts in different groups do not overlap and belong to different frequency domain resource groups.

According to a seventh aspect, a communications apparatus is provided. The apparatus has a function of implementing a behavior of the terminal device according to any one of the first aspect, the second aspect, the third aspect, the possible embodiments of the first aspect, the possible embodiments of the second aspect, or the possible embodiments of the third aspect. The function may be implemented by hardware, or may be implemented by hardware executing corresponding software. The hardware or the software includes one or more modules corresponding to the foregoing function.

In one embodiment, the apparatus may be a chip or an integrated circuit.

In one embodiment, the apparatus includes a memory and a processor. The memory stores a group of programs, and the processor is configured to execute the program stored in the memory. When the program is executed, the apparatus may perform the method according to any one of the first aspect, the second aspect, the third aspect, the possible embodiments of the first aspect, the possible embodiments of the second aspect, or the possible embodiments of the third aspect.

In one embodiment, the apparatus further includes a transceiver, configured to communicate with a network device.

In one embodiment, the apparatus is a terminal device.

According to an eighth aspect, a communications apparatus is provided. The apparatus has a function of implementing a behavior of the network device according to any one of the fourth aspect, the fifth aspect, the sixth aspect, the possible embodiments of the fourth aspect, the possible embodiments of the fifth aspect, or the possible embodiments of the sixth aspect. The function may be implemented by hardware, or may be implemented by hardware executing corresponding software. The hardware or the software includes one or more modules corresponding to the foregoing function.

In one embodiment, the apparatus may be a chip or an integrated circuit.

In one embodiment, the apparatus includes a memory and a processor. The memory stores a group of programs, and the processor is configured to execute the program stored in the memory. When the program is executed, the apparatus may perform the method according to any one of the fourth aspect, the fifth aspect, the sixth aspect, the possible embodiments of the fourth aspect, the possible embodiments of the fifth aspect, or the possible embodiments of the sixth aspect.

In one embodiment, the apparatus further includes a transceiver, configured to communicate with a terminal device.

In one embodiment, the apparatus is a network device.

According to a ninth aspect, a chip is provided. The chip is connected to a memory or the chip includes a memory, and is configured to read and execute a software program stored in the memory, to implement the method according to any one of the first aspect, the second aspect, the third aspect, the possible embodiments of the first aspect, the possible embodiments of the second aspect, or the possible embodiments of the third aspect.

According to a tenth aspect, a chip is provided. The chip is connected to a memory or the chip includes a memory, and is configured to read and execute a software program stored in the memory, to implement the method according to any one of the fourth aspect, the fifth aspect, the sixth aspect, the possible embodiments of the fourth aspect, the possible embodiments of the fifth aspect, or the possible embodiments of the sixth aspect.

According to an eleventh aspect, a communications system is provided. The communications system includes the apparatuses according to the seventh aspect and the eighth aspect.

According to a twelfth aspect, a computer storage medium is provided. The computer storage medium stores a computer program, and the computer program includes an instruction used to perform the method according to any one of the foregoing aspects and the possible embodiments of the foregoing aspects.

According to a thirteenth aspect, a computer program product is provided. When a computer reads and executes the computer program product, the computer is enabled to perform the method according to any one of the foregoing aspects and the possible embodiments of the foregoing aspects.

DESCRIPTION OF EMBODIMENTS

This application provides a communication method and a communications apparatus. A terminal device determines an available frequency domain resource in a bandwidth by using indication information that is received from a network device, so that the terminal device can avoid interference. Further, because the terminal device learns the available frequency domain resource, a condition of receiving, based on the available frequency domain resource, a signal by using a narrowband filter with a proper value is qualified. When using the bandwidth including a plurality of non-contiguous frequency domain resource groups, the terminal device can filter out a signal of another system by using the narrowband filter with the proper value, thereby helping avoid interference of the signal of the another system, and improve data transmission quality.

The method and the apparatus are based on a same or similar inventive concept. Because a problem-resolving principle of the method is similar to that of the apparatus, implementations of the apparatus and the method may mutually refer to each other. No repeated description is provided. In descriptions of the embodiments of this application, the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In this application, "at least one" means one or more, and "a plurality of" means two or more. In addition, it should be understood that, in the descriptions of this application, the terms such as "first" and "second" are merely used for differentiation and description, but should not be understood as indicating or implying relative importance, or should not be understood as indicating or implying a sequence. "At least one type" means one or more types, "at least one" means one or more, and "a plurality of" means two or more.

The communication method provided in the embodiments of this application may be applied to a 4th generation (4G) communications system, a 5th generation (5G) communications system, or various future communications systems.

The following describes in detail the embodiments of this application with reference to the accompanying drawings.

Figure 2:
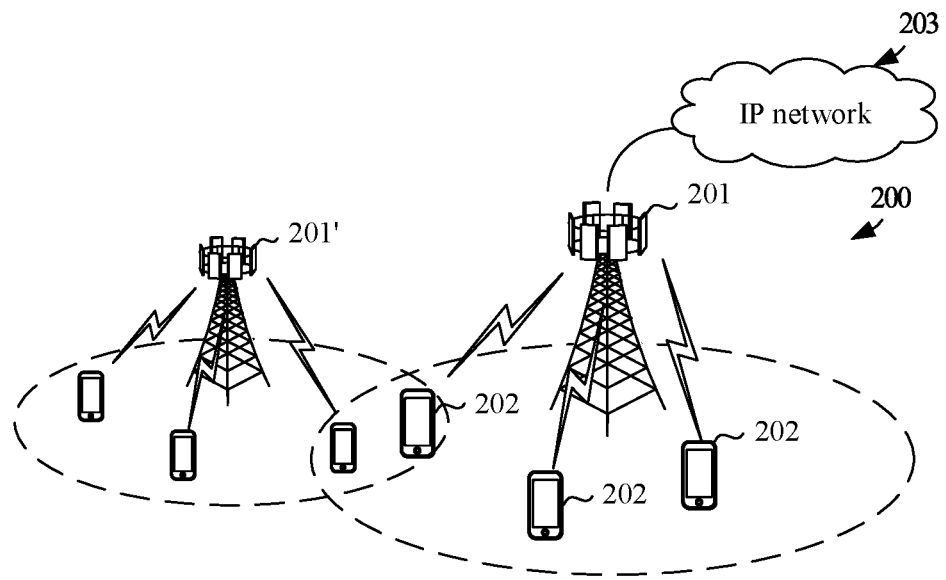
FIG. 2 is a schematic diagram of an architecture of a communications system according to an embodiment of this application.

FIG. 2 shows an architecture of a possible communications system to which a communication method according to an embodiment of this application is applicable. Referring to FIG. 2, the communications system 200 includes a network device 201 and one or more terminal devices 202. When the communications system 200 includes a core network, the network device 201 may be further connected to the core network. The network device 201 may communicate with an IP network 203 through the core network. For example, the IP network 203 may be an internet (internet), a private IP network, or another data network. The network device 201 provides a service for a terminal device 202 within coverage. For example, referring to FIG. 2, the network device 201 provides wireless access for one or more terminal devices 202 within the coverage of the network device 201. The communications system 200 may include a plurality of network devices, for example, may further include a network device 201'. There may be an overlapping area between coverage of network devices. For example, there is an overlapping area between coverage of the network device 201 and the network device 201'. The network devices may further communicate with each other. For example, the network device 201 may communicate with the network device 201'.

The network device 201 is a node in a radio access network (radio access network, RAN), and may also be referred to as a base station, or may be referred to as a RAN node (or a device). Currently, for example, the network device 201 is a gNB/NR-NB, a transmission reception point (TRP), an evolved NodeB (evolved NodeB, eNB), a radio network controller (RNC), a NodeB (NodeB, NB), a base station controller (base station controller, BSC), a base transceiver station (BTS), a home base station (for example, a home evolved NodeB, or a home NodeB, HNB), a baseband unit (BBU), a wireless fidelity (WiFi) access point (AP), or a network side device in a 5G communications system or a possible future communications system.

The terminal device 202 is also referred to as user equipment (UE), a mobile station (MS), a mobile terminal device (MT), or the like, and is a device that provides voice or data connectivity for a user, or may be an internet of things device. For example, the terminal device 202 includes a handheld device, a vehicle-mounted device, or the like that has a wireless connection function. Currently, the terminal device 202 may be a mobile phone, a tablet, a notebook computer, a palmtop computer, a mobile internet device (MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal device in industrial control, a smart home device (for example, a refrigerator, a television, an air conditioner, or an electricity meter), an intelligent robot, a workshop device, a wireless terminal device in self-driving, a wireless terminal device in remote medical surgery, a wireless terminal device in a smart grid, a wireless terminal device in transportation safety, a wireless terminal device in a smart city, a wireless terminal device in a smart home, a flight device (for example, an intelligent robot, a hot balloon, an unmanned aerial vehicle, or an aircraft), or the like.

For ease of understanding, several concepts in the embodiments of this application are first described.

(1) A bandwidth in the embodiments of this application may be one carrier bandwidth, one carrier bandwidth part, or one system bandwidth. Usually, a carrier bandwidth may be understood as a bandwidth occupied by a network side, a carrier bandwidth part may be understood as a bandwidth occupied by a terminal device, and one carrier bandwidth may include one or more carrier bandwidth parts. For example, a carrier bandwidth of 20 MHz may be divided into two 10 MHz carrier bandwidth parts. The bandwidth in the method in the embodiments of this application may be a large bandwidth including a discrete spectrum. The discrete spectrum may also be referred to as non-contiguous frequency domain resource groups. One frequency domain resource group occupies a part of the bandwidth, and one frequency domain resource group includes one or more contiguous frequency domain resource blocks.

(2) These non-contiguous frequency domain resource groups in the bandwidth are available frequency domain resources in the communications system. The available frequency domain resource in the method provided in the embodiments of this application is a resource that can be used in the bandwidth for communication between the terminal device and the network device, or is a resource occupied by an operator to which the terminal device and the network device belong. A resource, in the bandwidth, that cannot be used for communication between the terminal device and the network device is referred to as an unavailable frequency domain resource, and the unavailable frequency domain resource may be occupied by another operator. An intersection set between the unavailable frequency domain resource and the available frequency domain resource in the bandwidth is empty, that is, there is no overlapping part.

Figure 1:
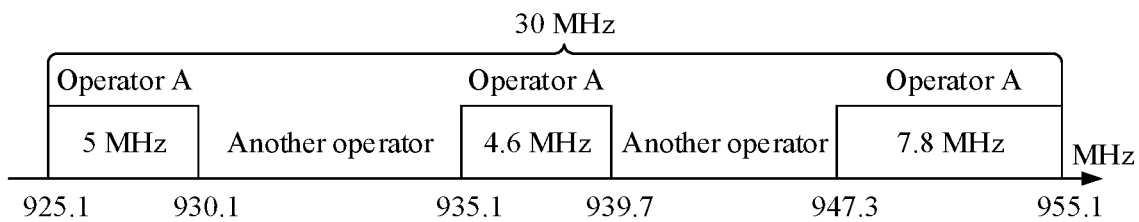
FIG. 1 is a schematic diagram of a discrete spectrum according to an embodiment of this application.

The foregoing concepts are described by using an example shown in FIG. 1. For example, a large bandwidth of 30 MHz shown in FIG. 1 includes a plurality of non-contiguous spectrum resource groups: 5 MHz, 4.6 MHz, and 7.8 MHz. The several segments of non-contiguous frequency domain resource groups jointly form an available frequency domain resource for communication between the terminal device and the network device. A resource allocated by the network device to the terminal device is located in the available frequency domain resource, and the available frequency domain resource may be further used by another terminal device in the communications system. A resource other than the non-contiguous frequency domain resource groups is an unavailable frequency domain resource and may be occupied by another operator.

Figure 3:
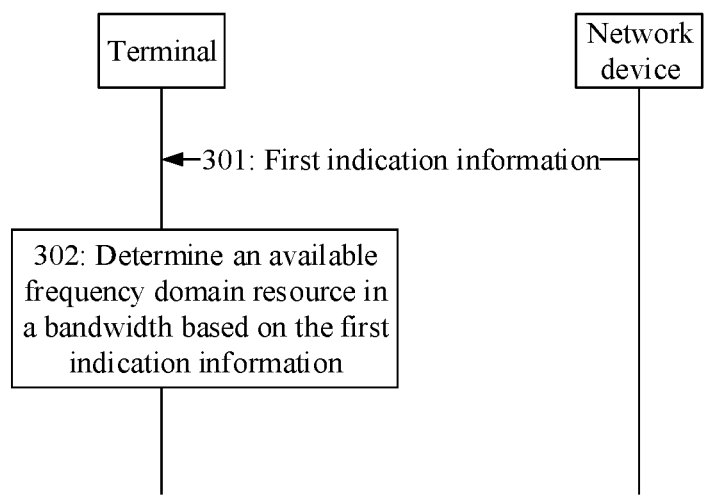
FIG. 3 is a first schematic flowchart of a communication method according to an embodiment of this application.

Based on the foregoing descriptions and the architecture of the communications system shown in FIG. 2, as shown in FIG. 3, the following describes in detail a communication method according to an embodiment of this application.

A main idea of the method provided in this embodiment of this application is that the network device indicates an available frequency domain resource or an unavailable frequency domain resource to the terminal device, and the terminal device determines, based on indication information of the network device, the available frequency domain resource and/or the unavailable frequency domain resource in the bandwidth, to perform a subsequent signal sending or receiving process based on the available frequency domain resource and/or the unavailable frequency domain resource. Both the available frequency domain resource and the unavailable frequency domain resource are one segment of a resource in a bandwidth. In this embodiment of this application, the available frequency domain resource in the bandwidth includes a plurality of non-contiguous frequency domain resource groups, and the unavailable frequency domain resource may include one or more non-contiguous frequency domain resource groups. Therefore, a method for indicating the available frequency domain resource by the network device to the terminal device is similar to that for indicating the unavailable frequency domain resource by the network device to the terminal device, and a method for determining, by the terminal device, the available frequency domain resource in the bandwidth is also similar to that for determining, by the terminal device, the unavailable frequency domain resource in the bandwidth. For the methods for indicating or determining the two resources, reference may be made to each other. When the bandwidth is known, the terminal device may determine the other when determining one of the available frequency domain resource and the unavailable frequency domain resource. In the following descriptions, an operation performed after the terminal device determines the available frequency domain resource is also applicable to that performed after the terminal device determines the unavailable frequency domain resource.

In the following descriptions, the method for indicating the available frequency domain resource and the method for determining the available resource are mainly described. It may be understood that the method for indicating the available frequency domain resource and the method for determining the available frequency domain resource may be applied to the unavailable frequency domain resource.

Operation 301: The network device sends first indication information to the terminal device, and the terminal device receives the first indication information from the network device.

The first indication information indicates an available frequency domain resource in a bandwidth.

Operation 302: The terminal device determines the available frequency domain resource in the bandwidth based on the first indication information.

The following further describes in detail embodiments of the foregoing communication method.

First, several possible representation forms of the first indication information are described.

Representation form 1:

The first indication information includes one bit sequence. The bit sequence may also be understood as a bitmap (bitmap), and a bit value in the bit sequence indicates the available frequency domain resource. One bit sequence is one field, and each bit in the field correspondingly indicates one frequency domain resource block, or each bit in the field correspondingly indicates a plurality of contiguous frequency domain resource blocks. In one embodiment, elements in the bit sequence include 1 and 0.

In an embodiment, one bit in the bit sequence indicates one frequency domain resource block, and a length of the bit sequence is equal to a quantity of frequency domain resource blocks in the bandwidth. For example, a bit value 1 indicates that a frequency domain resource block corresponding to a bit is an available frequency domain resource, and a bit value 0 indicates that a frequency domain resource block corresponding to a bit is an unavailable frequency domain resource. Certainly, it may be alternatively defined as that the bit value 0 indicates that the frequency domain resource block corresponding to the bit is the available frequency domain resource, and the bit value 1 indicates that the frequency domain resource block corresponding to the bit is the unavailable frequency domain resource.

In another embodiment, one bit in the bit sequence indicates a plurality of contiguous frequency domain resource blocks, and a length of the bit sequence may also be less than a quantity of frequency domain resource blocks in the bandwidth. Each bit in the bit sequence may also correspond to N contiguous frequency domain resource blocks, and N may be a positive integer greater than 1, for example, 2, 4, or 6. For example, a bit value 1 indicates that N contiguous frequency domain resource blocks corresponding to a bit are an available resource, and a bit value 0 indicates that N contiguous frequency domain resource blocks corresponding to a bit are an unavailable frequency domain resource. For another example, it may be alternatively defined as that the bit value 0 indicates that the N contiguous frequency domain resource blocks corresponding to the bit are the available resource, and the bit value 1 indicates that the N contiguous frequency domain resource blocks corresponding to the bit are the unavailable frequency domain resource.

The network device indicates, by using the bit values in the bit sequence, frequency domain resource blocks that are the available frequency domain resource and frequency domain resource blocks that are the unavailable resource. The terminal device determines the available frequency domain resource and the unavailable frequency domain resource in the bandwidth by using the bit values in the bit sequence.

The bandwidth shown in FIG. 1 is used as an example for description. For the bandwidth of 30 MHz shown in FIG. 1, a subcarrier spacing is 15 kHz, and a quantity of frequency domain resource blocks in the bandwidth may be 160. In one embodiment, the bit sequence may include 160 bits, and each bit correspondingly indicates one of the 160 frequency domain resource blocks. For example, a bit value 1 indicates that a frequency domain resource block corresponding to a bit is an available frequency domain resource. In one embodiment, the bit sequence may include (160/N) bits, each bit correspondingly indicates N contiguous frequency domain resource blocks of the 160 frequency domain resource blocks, and N is a positive integer greater than 1. When N=2, the bit sequence may include 80 bits, and each bit correspondingly indicates two contiguous frequency domain resource blocks of the 160 frequency domain resource blocks. For example, a bit value 1 indicates that two contiguous frequency domain resource blocks corresponding to a bit are an available frequency domain resource. When N=4, the bit sequence includes 40 bits, and each bit correspondingly indicates four contiguous frequency domain resource blocks of the 160 frequency domain resource blocks. For example, a bit value 1 indicates that four contiguous frequency domain resource blocks corresponding to a bit are an available frequency domain resource.

Figure 4A:
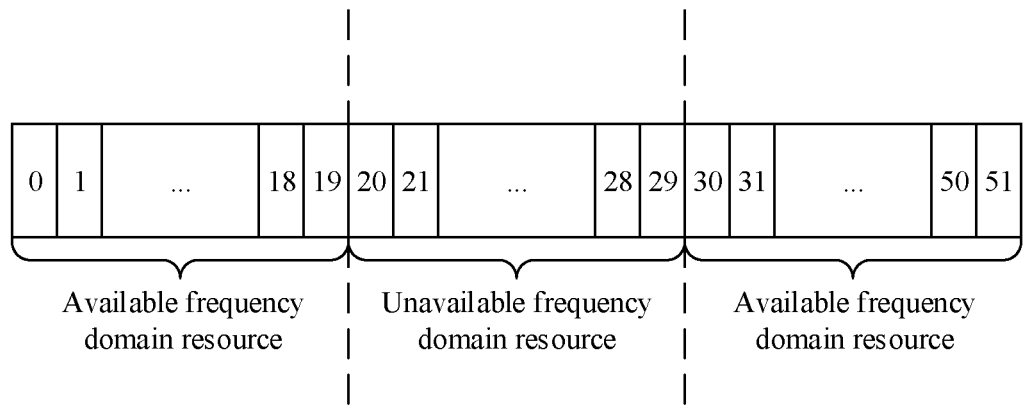
FIG. 4a is a first schematic diagram of a frequency domain resource in a bandwidth according to an embodiment of this application.

An example shown in FIG. 4a is used for further description. For example, as shown in FIG. 4a, the bandwidth includes 52 frequency domain resource blocks. The 52 frequency domain resource blocks are numbered from 0 to 51, that is, numbers are 0, 1, 2, . . . , and 51. The bandwidth includes the available frequency domain resource and the unavailable frequency domain resource, the available frequency domain resource and the unavailable frequency domain resource are separated by a dashed line, and the available frequency domain resource includes two non-contiguous frequency domain resource groups. One frequency domain resource group includes 20 contiguous frequency domain resource blocks, and the other frequency domain resource group includes 22 contiguous frequency domain resource blocks. In one embodiment, the bit sequence may include 52 bits, and each bit correspondingly indicates one of the 52 frequency domain resource blocks. For example, a bit value 1 indicates that a frequency domain resource block corresponding to a bit is an available frequency domain resource, and the bit sequence is {1 1 1 1 1 1 1 1 1 1 1 1 1 1 1 1 1 1 1 1 0 0 0 0 0 0 0 0 0 0 1 1 1 1 1 1 1 1 1 1 1 1 1 1 1 1 1 1 1 1 1 1}. In one embodiment, the bit sequence may include (52/N) bits, each bit correspondingly indicates N contiguous frequency domain resource blocks of the 52 frequency domain resource blocks, and N is a positive integer greater than 1. When N=2, the bit sequence includes 26 bits, and each bit correspondingly indicates two contiguous frequency domain resource blocks of the 52 frequency domain resource blocks. For example, a bit value 1 indicates that two contiguous frequency domain resource blocks corresponding to a bit are an available frequency domain resource, and the bit sequence is {1 1 1 1 1 1 1 1 1 0 0 0 0 0 1 1 1 1 1 1 1 1 1 1 1 1}.

Representation form 2:

The first indication information includes a plurality of indication units, and the indication unit may be referred to as a first indication unit herein. One first indication unit indicates one frequency domain resource group, and a plurality of first indication units correspond to a plurality of non-contiguous frequency domain resource groups. One indication unit may be understood as one field. Specifically, the first indication unit may indicate a frequency domain position of the frequency domain resource group. For example, the first indication unit may indicate at least two of the following: a start position, a length, and an end position of the frequency domain resource group.

For example, as shown in FIG. 4a, the bandwidth includes 52 frequency domain resource blocks. The 52 frequency domain resource blocks are numbered from 0 to 51, that is, numbers are 0, 1, 2, . . . , and 51. The bandwidth includes the available frequency domain resource and the unavailable frequency domain resource, and the available frequency domain resource includes two non-contiguous frequency domain resource groups. One frequency domain resource group includes 20 contiguous frequency domain resource blocks, and the other frequency domain resource group includes 22 contiguous frequency domain resource blocks. The first indication information includes two first indication units, and one first indication unit indicates one corresponding frequency domain resource group.

In one embodiment, the first indication unit indicates the start position and the length of the frequency domain resource group. One of the first indication units is {0, 20}, where 0 indicates that the start position of the frequency domain resource group is a frequency domain resource block numbered 0, and 20 indicates that the length of the frequency domain resource group is 20 frequency domain resource blocks, that is, the frequency domain resource group indicated by the first indication unit {0, 20} is 20 contiguous frequency domain resource blocks starting from the resource block numbered 0. The other of the first indication units is {30, 22}, where 30 indicates that the start position of the frequency domain resource group is a frequency domain resource block numbered 30, and 22 indicates that the length of the frequency domain resource group is 22 frequency domain resource blocks, that is, the frequency domain resource group indicated by the first indication unit {30, 22} is 22 contiguous frequency domain resource blocks starting from the frequency domain resource block numbered 30.

In one embodiment, the first indication unit indicates the start position and the end position of the frequency domain resource group. One of the first indication units is {0, 19}, and the first indication unit indicates that the start position of the frequency domain resource group is a frequency domain resource block numbered 0 and the end position of the frequency domain resource group is a frequency domain resource block numbered 19. The other of the first indication units is {30, 51}, and the first indication unit indicates that the start position of the frequency domain resource group is a frequency domain resource block numbered 30 and the end position of the frequency domain resource group is a frequency domain resource block numbered 51.

In one embodiment, the first indication unit indicates the end position and the length of the frequency domain resource group. One of the first indication units is {19, 20}, and the first indication unit indicates that the end position of the frequency domain resource group is a frequency domain resource block numbered 20 and the length of the frequency domain resource group is 20 frequency domain resource blocks. The other of the first indication units is {51, 22}, and the first indication unit indicates that the end position of the frequency domain resource group is a frequency domain resource block numbered 51 and the length of the frequency domain resource group is 22 frequency domain resource blocks.

In one embodiment, the first indication unit may further indicate an index value. The index value has a correspondence with a frequency domain position of the frequency domain resource group, and the frequency domain position of the frequency domain resource group is indicated by using the index value. The correspondence is predetermined, and the network device and the terminal device have a same understanding of the correspondence. For example, the index value may be a resource indication version (RIV). The RIV needs to be understood as a correspondence between the start position and the length that are of the frequency domain resource group and the index value.

The following describes another indication function of the first indication information.

Figure 4B:
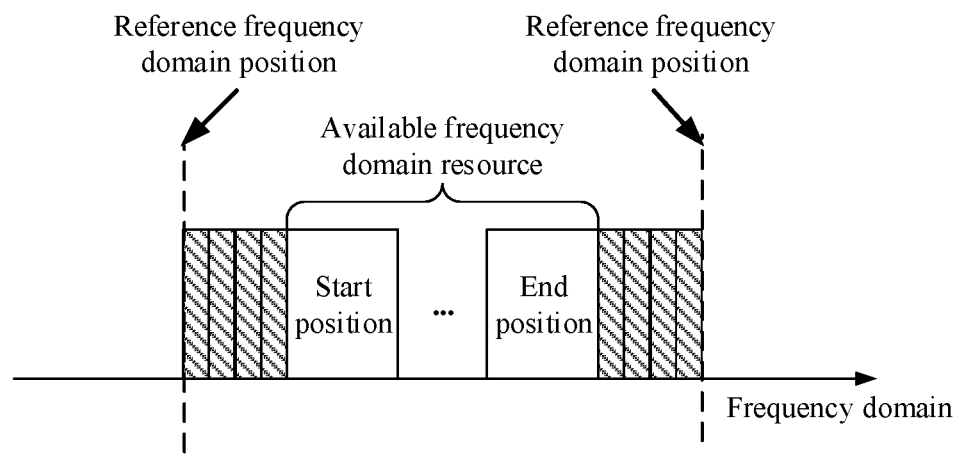
FIG. 4b is a first schematic diagram of a reference frequency domain position according to an embodiment of this application.

As described in the foregoing method, the first indication information indicates the available frequency domain resource in the bandwidth. In one embodiment, the first indication information may further indicate a reference frequency domain position of the frequency domain resource group. If there are a plurality of frequency domain resource groups in the bandwidth, a plurality of pieces of first indication information correspondingly indicate a plurality of reference frequency domain positions, and one piece of first indication information indicates a reference frequency domain position of one frequency domain resource group. The reference frequency domain position includes at least one of a first frequency domain position and a second frequency domain position, where the first frequency domain position is lower than the start position of the frequency domain resource group, and the second frequency domain position is higher than the end position of the frequency domain resource group. It should be noted that, that the first frequency domain position is lower than the start position of the frequency domain resource group may be understood as that a frequency corresponding to the first frequency domain position is less than a frequency corresponding to the $1^{st}$ subcarrier of the $1^{st}$ frequency domain resource block in the frequency domain resource group, and that the second frequency domain position is higher than the end position of the frequency domain resource group may be understood as that a frequency corresponding to the second frequency domain position is greater than a frequency corresponding to the last subcarrier of the last frequency domain resource block in the frequency resource group. A bandwidth between the first frequency domain position and the start position may be considered as a guard bandwidth of the frequency domain resource group, and a bandwidth between the end position and the second frequency domain position may be considered as a guard bandwidth of the frequency domain resource group. FIG. 4b shows an example of a reference frequency domain position of one frequency domain resource group. Bandwidths of shadow areas in FIG. 4b is guard bandwidths, and the reference frequency domain position includes a first frequency domain position located at a low frequency side position of the frequency domain resource group and a second frequency domain position located at a high frequency side position of the frequency domain resource group.

embodimentIn one embodiment, the first indication information directly indicates the reference frequency domain position. For example, the first indication information indicates the reference frequency domain position by using an absolute radio frequency channel number (ARFCN), and one ARFCN corresponds to one absolute frequency. For another example, the first indication information indicates the number of a subcarrier corresponding to the reference frequency position. The number of the subcarrier may be a number for which a common reference point of the bandwidth is used as a reference, and the common reference point may be a reference point A in an NR system. It should be understood that, the reference point A is substantially the common reference point, and a name of the reference point A is not limited. Specifically, if the number of the subcarrier of the common reference point is 0, the first indication information may indicate that the subcarrier corresponding to the reference frequency position is X, and X is a positive integer. Therefore, the terminal device may first determine a frequency F1 at which the common reference point is located, and then determine a frequency F2=F1+X×S at the reference frequency position, where S is a subcarrier spacing, and a value of S may be 15 kHz or another value.

In another embodiment, the first indication information indicates a first offset value between the first frequency domain position and the start position of the frequency domain resource group, or indicates a second offset value between the second frequency domain position and the end position of the frequency domain resource group, or indicates both a first offset value and a second offset value, where the first offset value and the second offset value may be the same or different. In one embodiment, the first offset value may be in a unit of a subcarrier spacing. Therefore, the first indication information indicates that an offset between the first frequency domain position and the start position of the frequency domain resource group is A subcarrier spacings. The start position of the frequency domain resource group herein needs to be understood as a frequency of the $1^{st}$ subcarrier of the $1^{st}$ frequency domain resource block in the frequency domain resource group, and the subcarrier spacing corresponding to the first offset value may be the same as or different from the subcarrier spacing of the frequency domain resource block. This is not limited herein. In one embodiment, the first offset value may be in a unit of 5 kHz. Therefore, the first indication information indicates that an offset between the first frequency domain position and the start position of the frequency domain resource group is a frequency of B×5 kHz. Similarly, the second offset may alternatively be in a unit of a subcarrier spacing. The first indication information indicates that an offset between the second frequency domain position and the end position of the frequency domain resource group is C subcarrier spacings. The end position of the frequency domain resource group herein needs to be understood as a frequency of the last subcarrier of the last frequency domain resource block in the frequency domain resource group, and the subcarrier spacing corresponding to the second offset value may be the same as or different from the subcarrier spacing of the frequency domain resource block. This is not limited herein. For example, the second offset value may be in a unit of 5 kHz, and the first indication information indicates that an offset between the second frequency domain position and the end position of the frequency domain resource group is a frequency of D×5 kHz. A, B, C, and D are all positive integers. In one embodiment, the first indication information may alternatively indicate only one offset value. For a method for indicating the offset value, refer to the foregoing method. Details are not described herein. In this case, the terminal device may determine that the first offset value between the first frequency domain position and the start position of the frequency domain resource group is equal to the offset value indicated by the first indication information, and determine that the second offset value between the second frequency domain position and the end position of the frequency domain resource group is also equal to the offset value indicated by the first indication information. As shown in FIG. 4b, the first offset value may be considered as the bandwidth of the shadow area at the low frequency position of the frequency domain resource group, and the second offset value may be considered as the bandwidth of the shadow area at the high frequency position of the frequency domain resource group.

When there are a plurality of frequency domain resource groups in the bandwidth, a reference frequency domain position of each frequency domain resource group is indicated by using the first indication information. For example, the first indication information includes a plurality of indication units, and each indication unit corresponds to one frequency domain resource group, and indicates a reference frequency domain position of the corresponding frequency domain resource group. Further, as described above, the representation forms of the first indication information include two embodiments. In one embodiment, the first indication information includes a bit sequence. In this case, the first indication information further includes a plurality of indication units. For ease of description, the indication unit herein is referred to as a second indication unit, and each second indication unit correspondingly indicates a reference frequency domain position of one frequency domain resource group. Correspondingly, the second indication unit directly indicates the reference frequency domain position. For example, the second indication unit indicates the reference frequency domain position by using an ARFCN or a number of a subcarrier. Alternatively, the second indication unit indicates one or both of the first offset value and the second offset value.

In another embodiment, the first indication information includes a plurality of first indication units. In this case, the first indication unit further indicate the reference frequency domain position of the frequency domain resource group. Correspondingly, the first indication unit directly indicates the reference frequency domain position. For example, the first indication unit indicates the reference frequency domain position by using an ARFCN or a number of a subcarrier. Alternatively, the first indication unit indicates at least one of the first offset value and the second offset value. Specifically, one part of a field in the first indication unit indicates the frequency domain position of the frequency domain resource group, and the other part of the field indicates at least one of the first offset value and the second offset value of the frequency domain resource group.

The first indication information indicates the reference frequency domain position of the frequency domain resource group, so that the terminal device can more precisely determine, based on the reference frequency domain position, a narrowband range in which filtering can be performed, and can more flexibly configure a bandwidth of a filter. For example, the terminal device may set the bandwidth of the filter with reference to a value of the frequency domain resource group and the reference frequency domain position, thereby lowering a requirement on the filter.

The following describes operations of the terminal device in some embodiments after the terminal device is scheduled.

After determining the available frequency domain resource in the bandwidth, the terminal device performs signal sending and receiving based on the available frequency domain resource when being scheduled. Similarly, after determining the unavailable frequency domain resource in the bandwidth, the terminal device does not perform signal sending and receiving on the unavailable frequency domain resource when being scheduled.

For downlink signal transmission, specifically, the network device sends second indication information to the terminal device. The second indication information indicates a downlink resource, the downlink resource is used by the terminal device to receive a downlink signal from the network device, and the downlink resource is in the bandwidth. The terminal device receives the second indication information from the network device, to obtain the downlink resource indicated by the network device. In one embodiment, there are usually two indication manners for the second indication information. The first indication manner is a discrete frequency domain resource indication manner. To be specific, the second indication information includes one bit sequence, and each bit in the bit sequence correspondingly indicates X contiguous frequency domain resource blocks in the bandwidth. In the prior art, when the downlink resource is indicated, all frequency domain resource blocks in the bandwidth need to be indicated. When a total quantity of frequency domain resource blocks in the bandwidth is Y, the bit sequence included in information (for example, downlink indication information) indicating the downlink resource has Y/X bits. If Y/X is a non-integer, Y/X can be rounded up or down, and Y/X is usually rounded up. In this embodiment of this application, a length of the bit sequence included in the second indication information is determined based on a quantity of available downlink resource blocks in the bandwidth and a quantity X of contiguous resource blocks indicated by one bit. In this embodiment of this application, the length of the bit sequence is a quantity of bits included in the bit sequence. After receiving the first indication information, the terminal device may determine a quantity of available downlink resource blocks in the Y frequency domain resource blocks. The quantity of available downlink resource blocks is denoted as $Y_1$, and $Y_1 < Y$. The length of the bit sequence included in the second indication information is $Y_1/X$. If $Y_1/X$ is a non-integer, $Y_1/X$ can be rounded up or down, and $Y_1/X$ is usually rounded up. In the foregoing manner of indicating the downlink resource by using the second indication information, the second indication information only needs to indicate the available downlink resource block, and does not need to indicate all the frequency domain resource blocks in the bandwidth. Compared with the prior art, the quantity of bits of the second indication information can be reduced, overheads of downlink indication resources of the network device can be reduced, and complexity of processing downlink indication information by the terminal device can be reduced. FIG. 4a is used as an example. A total quantity of frequency domain resource blocks in the bandwidth is Y (Y=52), each bit in the bit sequence corresponds to X (X=2) contiguous frequency domain resource blocks in the bandwidth. A quantity $Y_1$ of available resource blocks determined by the terminal device based on the first indication information is 42, and the length of the bit sequence included in the second indication information is $Y_1/X$ ($Y_1/X=21$).

The second indication manner is a continuous frequency domain resource indication manner. To be specific, the second indication information includes one RIV, to indicate one segment of contiguous resource blocks in the bandwidth. In the prior art, a quantity of bits needed by information (for example, downlink indication information) indicating a downlink resource is related to a total quantity Y of frequency domain resource blocks in the bandwidth, and the quantity of bits is usually a value obtained by rounding up log 2(Y×(Y+1)/2). After receiving the first indication information, the terminal device may determine a quantity of available downlink frequency domain resource blocks in the Y frequency domain resource blocks. The quantity of available downlink resource blocks is denoted as $Y_1$, and $Y_1 < Y$. The quantity of bits needed by the RIV included in the second indication information is determined based on the quantity of available downlink frequency domain resource blocks in the bandwidth, namely, a value obtained by rounding up log 2($Y_1$×($Y_1$+1)/2). In the foregoing manner of indicating the downlink resource by using the second indication information, the RIV included in the second indication information only needs to indicate the available downlink resource block, and does not need to indicate the total quantity Y of frequency domain resource blocks in the bandwidth. Compared with the prior art, the quantity of bits in the bit sequence included in the second indication information is correspondingly reduced. This helps reduce overheads of downlink indication resources of the network device and reduce complexity of processing downlink indication information by the terminal device. It should be noted that, in this case, the frequency domain resource block indicated by the RIV in the second indication information is indexed based on the available frequency domain resource block. For example, FIG. 4a is used as an example. When the RIV indicates that a start resource block of the segment of contiguous frequency domain resource blocks is a resource block numbered 19 and a length of the resource block is 2, the frequency domain resource blocks determined by the terminal device is two frequency domain resource blocks numbered 19 and 30 in FIG. 4a.

Based on the foregoing two indication manners of the second indication information, the second indication information indicates only the available downlink resource block in the bandwidth. If the second indication information still uses the indication manner in the prior art, the downlink resource indicated by the second indication information is the segment of contiguous resource blocks, and the contiguous resource blocks may be located in one frequency domain resource group. In this case, an intersection set between the downlink resource and the unavailable frequency domain resource is null. The contiguous resource blocks may also be located in a plurality of frequency domain resource groups. Because the plurality of frequency domain resource groups are non-contiguous, the downlink resource indicated by the second indication information may also include an unavailable downlink frequency domain resource block. In this case, an intersection set between the downlink resource and the unavailable frequency domain resource is not null.

When the downlink resource indicated by the second indication information includes the unavailable downlink frequency domain resource block, the terminal device receives the downlink signal only on the available downlink frequency domain resource block.

It should be noted that, in the descriptions of this embodiment of this application, the available downlink frequency domain resource block is a resource block that belongs to both the downlink resource and the available frequency domain resource. In other words, the available downlink frequency domain resource block belongs to one or more frequency domain resource groups. The unavailable downlink frequency domain resource block is a resource block belongs to the downlink resource but does not belong to the available frequency domain resource. In other words, the unavailable downlink frequency domain resource block does not belong to any frequency domain resource group.

If the available downlink frequency domain resource block is located in the plurality of frequency domain resource groups, the terminal device receives the downlink signal on the plurality of frequency domain resource groups by using a plurality of radio frequency units. The plurality of radio frequency units correspond to the plurality of frequency domain resource groups, and one radio frequency unit corresponds to one frequency domain resource group.

If the available downlink frequency domain resource block is located in the plurality of frequency domain resource groups, the terminal device processes, by using a plurality of filters, the downlink signal received on the plurality of frequency domain resource groups. The plurality of filters correspond to the plurality of frequency domain resource groups, and one filter corresponds to one frequency domain resource group. Specifically, the terminal device sets a bandwidth of the filter based on a value of the frequency domain resource group. In one embodiment, the terminal device may further set the bandwidth of the filter based on the value of the frequency domain resource group and the reference frequency domain position. In this way, the terminal device may determine the plurality of filters based on the plurality of frequency domain resource groups, and perform, by using the plurality of filters, filtering processing on the downlink signal received on the plurality of frequency domain resources, and interference from another system signal on an unavailable downlink frequency domain resource can be effectively avoided. When the bandwidth of the filter is set with reference to the reference frequency domain position, the bandwidth of the filter can be set more flexibly, thereby reducing a requirement on the filter.

For uplink signal transmission, specifically, the network device sends third indication information to the terminal device. The third indication information indicates an uplink resource, the uplink resource is used by the terminal device to send an uplink signal to the network device, and the uplink resource is in the bandwidth. The terminal device receives the third indication information from the network device. Similar to the indication manners of the second indication information, the third indication information usually has two indication manners. The first indication manner is a discrete frequency domain resource indication manner. To be specific, the third indication information includes one bit sequence, and each bit in the bit sequence correspondingly indicates X contiguous frequency domain resource blocks in the bandwidth. In the prior art, when the uplink resource is indicated, all frequency domain resource blocks in the bandwidth need to be indicated. When a total quantity of frequency domain resource blocks in the bandwidth is Y, the bit sequence included in information (for example, uplink indication information) indicating the uplink resource has Y/X bits. If Y/X is a non-integer, Y/X can be rounded up or down, and Y/X is usually rounded up. In this embodiment of this application, a length of the bit sequence included in the third indication information is determined based on a quantity of available uplink resource blocks in the bandwidth and a quantity X of contiguous resource blocks indicated by one bit. In this embodiment of this application, the length of the bit sequence is a quantity of bits included in the bit sequence. After receiving the first indication information, the terminal device may determine a quantity of available uplink resource blocks in the Y frequency domain resource blocks. The quantity of available uplink resource blocks is denoted as $Y_1$, and $Y_1<Y$. The length of the bit sequence included in the third indication information is $Y_1/X$. If $Y_1/X$ is a non-integer, $Y_1/X$ can be rounded up or down, and $Y_1/X$ is usually rounded up. In the foregoing manner of indicating the uplink resource by using the third indication information, the third indication information only needs to indicate the available uplink resource block, and does not need to indicate all the frequency domain resource blocks in the bandwidth. Compared with the prior art, the quantity of bits of the third indication information can be reduced, overheads of uplink indication resources of the network device can be reduced, and complexity of processing uplink indication information by the terminal device can be reduced. FIG. 4a is used as an example. A total quantity of frequency domain resource blocks in the bandwidth is Y (Y=52), each bit in the bit sequence corresponds to X (X=2) contiguous frequency domain resource blocks in the bandwidth. A quantity $Y_1$ of available resource blocks determined by the terminal device based on the first indication information is 42, and the length of the bit sequence included in the third indication information is $Y_1/X$ ($Y_1/X=21$).

The second indication manner is a continuous frequency domain resource indication manner. To be specific, the third indication information includes one RIV, to indicate one segment of contiguous resource blocks in the bandwidth. In the prior art, a quantity of bits needed by information (for example, uplink indication information) indicating an uplink resource is related to a total quantity Y of frequency domain resource blocks in the bandwidth, and the quantity of bits is usually a value obtained by rounding up $\log 2(Y \times (Y+1)/2)$. After receiving the first indication information, the terminal device may determine a quantity of available uplink frequency domain resource blocks in the Y frequency domain resource blocks. The quantity of available uplink resource blocks is denoted as $Y_1$, and $Y_1 < Y$. The quantity of bits needed by the RIV included in the third indication information is determined based on the quantity of available uplink frequency domain resource blocks in the bandwidth, namely, a value obtained by rounding up $\log 2(Y_1 \times (Y_1+1)/2)$. In the foregoing manner of indicating the uplink resource by using the third indication information, the RIV included in the third indication information only needs to indicate the available uplink resource block, and does not need to indicate the total quantity Y of frequency domain resource blocks in the bandwidth. Compared with the prior art, the quantity of bits in the bit sequence included in the third indication information is correspondingly reduced. This helps reduce overheads of uplink indication resources of the network device and reduce complexity of processing uplink indication information by the terminal device. It should be noted that, in this case, the frequency domain resource block indicated by the RIV in the third indication information is indexed based on the available frequency domain resource block. For example, FIG. 4a is used as an example. When the RIV indicates that a start resource block of the segment of contiguous frequency domain resource blocks is a resource block numbered 19 and a length of the resource block is 2, the frequency domain resource blocks determined by the terminal device is two frequency domain resource blocks numbered 19 and 30 in FIG. 4a.

Based on the foregoing two indication manners of the third indication information, the third indication information indicates only the available uplink resource block in the bandwidth. If the third indication information still uses the indication manner in the prior art, the uplink resource indicated by the third indication information is the segment of contiguous resource blocks, and the contiguous resource blocks may be located in one frequency domain resource group. In this case, an intersection set between the uplink resource and the unavailable frequency domain resource is null. The contiguous resource blocks may also be located in a plurality of frequency domain resource groups. Because the plurality of frequency domain resource groups are non-contiguous, the uplink resource indicated by the third indication information may also include an unavailable uplink frequency domain resource block. In this case, an intersection set between the uplink resource and the unavailable frequency domain resource is not null.

When the uplink resource indicated by the third indication information includes the unavailable uplink frequency domain resource block, the terminal device sends the uplink signal only on the available uplink frequency domain resource block.

Further, the terminal device may send the uplink signal to the network device by using an orthogonal frequency division multiplexing (OFDM) waveform and a discrete Fourier transformation-spread-orthogonal frequency division multiplexing (discrete Fourier transformation-spread-orthogonal frequency division multiplexing, DFT-S-OFDM) waveform. The network device preconfigures, for the terminal device, a waveform for sending the uplink signal. The waveform, for sending the uplink signal, that is preconfigured by the network device for the terminal device is as DFT-S-OFDM. If the uplink resource indicated by the third indication information belongs to only one frequency domain resource group, the terminal device still sends the uplink signal by using the DFT-S-OFDM waveform. If the uplink resource indicated by the second indication information belongs to at least two frequency domain resource groups, the terminal device sends the uplink signal by using the OFDM waveform.

It should be noted that, in the descriptions of this embodiment of this application, the available uplink frequency domain resource block is a resource block that belongs to both the uplink resource and the available frequency domain resource. The unavailable downlink frequency domain resource block is a resource block belongs to the downlink resource but does not belong to the available frequency domain resource.

If the available uplink frequency domain resource block is located in the plurality of frequency domain resource groups, the terminal device sends the uplink signal on the plurality of frequency domain resource groups by using a plurality of radio frequency units. The plurality of radio frequency units correspond to the plurality of frequency domain resource groups, and one radio frequency unit corresponds to one frequency domain resource group.

If the available uplink frequency domain resource block is located in the plurality of frequency domain resource groups, the terminal device processes, by using a plurality of filters, the uplink signal sent on the plurality of frequency domain resource groups. The plurality of filters correspond to the plurality of frequency domain resource groups, and one filter corresponds to one frequency domain resource group. Specifically, the terminal device sets a bandwidth of the filter based on a value of the frequency domain resource group. In one embodiment, the terminal device may further set the bandwidth of the filter based on the value of the frequency domain resource group and the reference frequency domain position. In this way, the terminal device may determine the plurality of filters based on the plurality of frequency domain resource groups, and perform, by using the plurality of filters, filtering processing on the uplink signal sent on the plurality of frequency domain resources, and interference from another system signal on an unavailable uplink frequency domain resource can be effectively avoided. When the bandwidth of the filter is set with reference to the reference frequency domain position, the bandwidth of the filter can be set more flexibly, thereby reducing a requirement on the filter.

In the foregoing descriptions, the uplink signal sent by the terminal device on the available frequency domain resource may be an uplink data signal, an uplink control signal, or an uplink reference signal. The uplink reference signal includes a demodulation pilot, a sounding pilot, and a phase tracking pilot. The downlink signal received by the terminal device on the available frequency domain resource may be a downlink data signal, a downlink control signal, or a downlink reference signal. The downlink reference signal may also be a downlink pilot signal, and the downlink pilot signal includes a demodulation pilot, a measurement pilot, a phase tracking pilot, and a tracking pilot.

If the available downlink frequency domain resource block is located in the plurality of frequency domain resource groups, the downlink signal is the downlink data signal, the downlink data signal includes one or more transport blocks, and the transport block may be referred to as a first transport block. In this way, any first transport block is carried on all the available downlink frequency domain resource blocks located in the plurality of frequency domain resource groups. In other words, an entire transport block of downlink data signal sent by the network device is carried on all the available downlink frequency domain resource blocks allocated to the terminal device.

Similarly, if the available uplink frequency domain resource block belongs to the plurality of frequency domain resource groups, the uplink signal is the uplink data signal, and the uplink data signal includes at least one second transport block. In this way, any second transport block is carried on all the available uplink frequency domain resource blocks located in the plurality of frequency domain resource groups. In other words, an entire transport block of uplink data sent by the terminal device is carried on all the available downlink frequency domain resource blocks occupied by the terminal device.

For example, in the bandwidth shown in FIG. 4a, if the available downlink frequency domain resource blocks are resource blocks numbered 18 and 19 and resource blocks numbered 30 and 31, each first transport block included in the downlink data signal is carried on the four resource blocks numbered 18 and 19, and 30 and 31. Similarly, if the available uplink frequency domain resource blocks are resource blocks numbered 18 and 19 and resource blocks numbered 30 and 31, each second transport block included in the uplink data signal is carried on the four resource blocks numbered 18 and 19, and 30 and 31.

Figure 5:
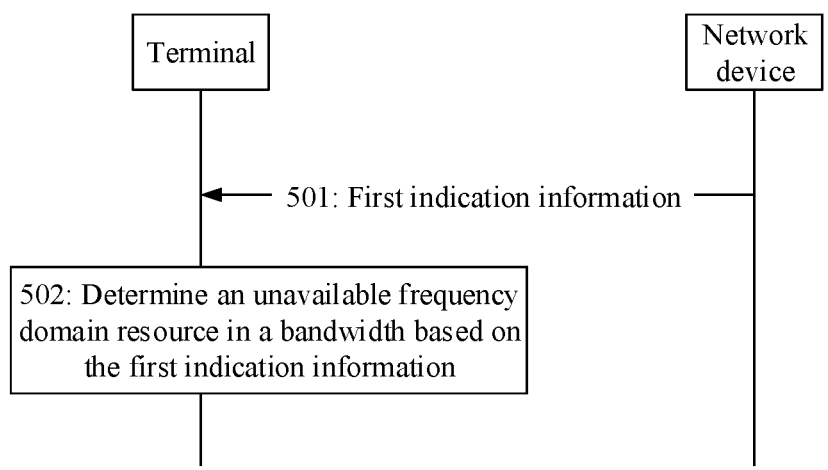
FIG. 5 is a second schematic flowchart of a communication method according to an embodiment of this application.

With reference to the foregoing method for indicating the available resource and the foregoing method for determining the available resource, the following describes a method for indicating an unavailable resource and a method for determining an unavailable resource. As shown in FIG. 5, another communication method provided in an embodiment of this application is described as follows.

It should be noted that, in the foregoing descriptions, if the first indication information indicates the unavailable frequency domain resource, the method is the same, and details are not described herein.

Operation 501: A network device sends first indication information to a terminal device, and the terminal device receives the first indication information from the network device.

The first indication information indicates an unavailable frequency domain resource in a bandwidth.

Operation 502: The terminal device determines the unavailable frequency domain resource in the bandwidth based on the first indication information.

The following further describes in detail embodiments of the foregoing communication method.

First, several possible representation forms of the first indication information are described.

Representation form 1:

The first indication information includes one bit sequence. The bit sequence may also be understood as a bitmap (bitmap), and a bit value in the bit sequence indicates the unavailable frequency domain resource in the bandwidth. One bit sequence is one field, and each bit in the field correspondingly indicates one frequency domain resource block, or each bit in the field correspondingly indicates a plurality of contiguous frequency domain resource blocks. In one embodiment, elements in the bit sequence include 1 and 0.

In one embodiment, one bit in the bit sequence indicates one frequency domain resource block, and a length of the bit sequence is equal to a quantity of frequency domain resource blocks in the bandwidth. For example, a bit value 1 indicates that a frequency domain resource block corresponding to a bit is an available frequency domain resource, and a bit value 0 indicates that a frequency domain resource block corresponding to a bit is an unavailable frequency domain resource. Certainly, it may be alternatively defined as that the bit value 0 indicates that the frequency domain resource block corresponding to the bit is the available frequency domain resource, and the bit value 1 indicates that the frequency domain resource block corresponding to the bit is the unavailable frequency domain resource.

In another optional implementation, one bit in the bit sequence indicates a plurality of contiguous frequency domain resource blocks, and a length of the bit sequence may also be less than a quantity of frequency domain resource blocks in the bandwidth. Each bit in the bit sequence may also correspond to N contiguous frequency domain resource blocks, and N may be a positive integer greater than 1, for example, 2, 4, or 6. For example, a bit value 1 indicates that N contiguous frequency domain resource blocks corresponding to a bit are an unavailable resource, and a bit value 0 indicates that N contiguous frequency domain resource blocks corresponding to a bit are an available frequency domain resource. For another example, it may be alternatively defined as that the bit value 0 indicates that the N contiguous frequency domain resource blocks corresponding to the bit are the unavailable resource, and the bit value 1 indicates that the N contiguous frequency domain resource blocks corresponding to the bit are the available frequency domain resource.

The network device indicates, by using the bit values in the bit sequence, frequency domain resource blocks that are the available frequency domain resource and frequency domain resource blocks that are the unavailable resource. The terminal device determines the available frequency domain resource and the unavailable frequency domain resource in the bandwidth by using the bit values in the bit sequence.

Figure 6A:
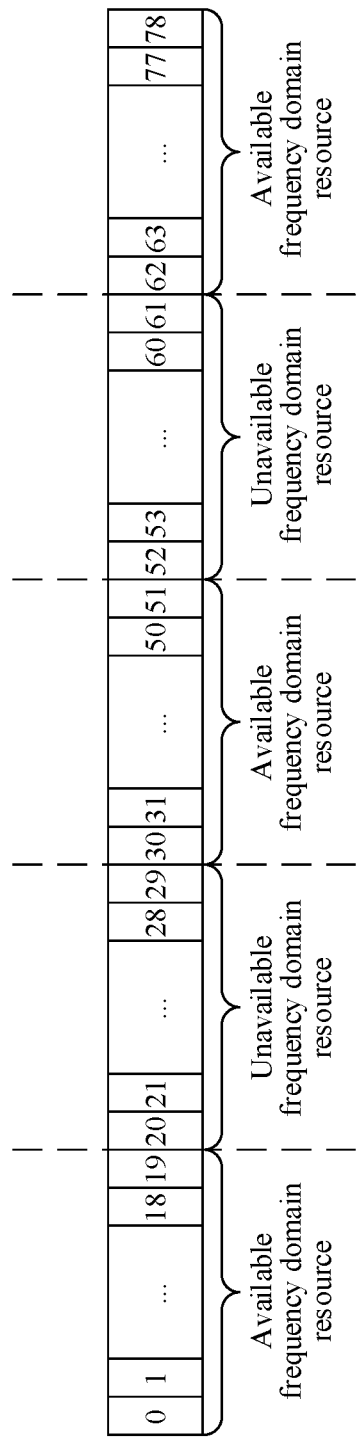
FIG. 6a is a second schematic diagram of a frequency domain resource in a bandwidth according to an embodiment of this application.

For example, as shown in FIG. 6a, the bandwidth includes 79 frequency domain resource blocks. The 79 frequency domain resource blocks are numbered from 0 to 78, that is, numbers are 0, 1, 2, . . . , and 78. The bandwidth includes the available frequency domain resource and the unavailable frequency domain resource, the available frequency domain resource and the unavailable frequency domain resource are separated by a dashed line, and the unavailable frequency domain resource includes two non-contiguous frequency domain resource groups. One frequency domain resource group includes 10 contiguous frequency domain resource blocks with numbers being 20 to 29, and the other frequency domain resource group includes 10 contiguous frequency domain resource blocks with numbers being 52 to 61. In one embodiment, the bit sequence may include 79 bits, and each bit correspondingly indicates one of the 79 frequency domain resource blocks. For example, a bit value 0 indicates that a frequency domain resource block corresponding to a bit is an unavailable frequency domain resource, and the bit sequence is {1 1 1 1 1 1 1 1 1 1 1 1 1 1 1 1 1 1 1 1 0 0 0 0 0 0 0 0 0 0 1 1 1 1 1 1 1 1 1 1 1 1 1 1 1 1 1 1 1 1 1 1 0 0 0 0 0 0 0 0 0 0 1 1 1 1 1 1 1 1 1 1 1 1 1 1 1 1 1}. In one embodiment, the bit sequence may include (79/N) bits, and a value of the bit sequence is usually rounded up. Each bit correspondingly indicates N contiguous frequency domain resource blocks of the 79 frequency domain resource blocks, and N is a positive integer greater than 1. When N=2, the bit sequence includes 40 bits, each bit correspondingly indicates two contiguous frequency domain resource blocks of the 79 frequency domain resource blocks, and the last bit correspondingly indicates the last frequency domain resource block. For example, a bit value 0 indicates that a frequency domain resource block corresponding to a bit is an unavailable frequency domain resource, and the bit sequence is {1 1 1 1 1 1 1 1 1 1 1 0 0 0 0 0 1 1 1 1 1 1 1 1 1 1 1 0 0 0 0 0 1 1 1 1 1 1 1 1 1}.

Representation form 2:

The frequency domain resource group described in this part is a frequency domain resource group in the unavailable frequency domain resource.

The first indication information includes a plurality of indication units, and the indication unit may be referred to as a first indication unit herein. One first indication unit indicates one frequency domain resource group in the unavailable frequency domain resource, and a plurality of first indication units correspond to a plurality of non-contiguous frequency domain resource groups. One indication unit may be understood as one field. Specifically, the first indication unit may indicate a frequency domain position of the frequency domain resource group. For example, the first indication unit may indicate at least two of the following: a start position, a length, and an end position of the frequency domain resource group.

For example, as shown in FIG. 6a, the bandwidth includes 79 frequency domain resource blocks. The 79 frequency domain resource blocks are numbered from 0 to 78, that is, numbers are 0, 1, 2, . . . , and 78. The bandwidth includes the available frequency domain resource and the unavailable frequency domain resource, the available frequency domain resource and the unavailable frequency domain resource are separated by a dashed line, and the unavailable frequency domain resource includes two non-contiguous frequency domain resource groups. One frequency domain resource group includes 10 contiguous frequency domain resource blocks with numbers being 20 to 29, and the other frequency domain resource group includes 10 contiguous frequency domain resource blocks with numbers being 52 to 61. The first indication information includes two first indication units, and one first indication unit indicates one frequency domain resource group corresponding to the unavailable frequency domain resource.

In one embodiment, the first indication unit indicates the start position and the length of the frequency domain resource group. One of the first indication units is {20, 10}, where 20 indicates that the start position of the frequency domain resource group is a frequency domain resource block numbered 20, and 10 indicates that the length of the frequency domain resource group is 10 frequency domain resource blocks, that is, the frequency domain resource group indicated by the first indication unit {20, 10} is 10 contiguous frequency domain resource blocks starting from the frequency domain resource block numbered 20. The other of the first indication units is {52, 10}, where 52 indicates that the start position of the frequency domain resource group is a frequency domain resource block numbered 52, and 10 indicates that the length of the frequency domain resource group is 10 frequency domain resource blocks, that is, the frequency domain resource group indicated by the first indication unit {52, 10} is 10 contiguous frequency domain resource blocks starting from the frequency domain resource block numbered 52.

In one embodiment, the first indication unit indicates the start position and the end position of the frequency domain resource group. One of the first indication units is {20, 29}, and the first indication unit indicates that the start position of the frequency domain resource group is a frequency domain resource block numbered 20 and the end position of the frequency domain resource group is a frequency domain resource block numbered 29. The other of the first indication units is {52, 61}, and the first indication unit indicates that the start position of the frequency domain resource group is a frequency domain resource block numbered 52 and the end position of the frequency domain resource group is a frequency domain resource block numbered 61.

In one embodiment, the first indication unit indicates the end position and the length of the frequency domain resource group. One of the first indication units is {29, 10}, and the first indication unit indicates that the end position of the frequency domain resource group is a frequency domain resource block numbered 29 and the length of the frequency domain resource group is 10 frequency domain resource blocks. The other of the first indication units is {61, 10}, and the first indication unit indicates that the end position of the frequency domain resource group is a frequency domain resource block numbered 61 and the length of the frequency domain resource group is 10 frequency domain resource blocks.

In one embodiment, the first indication unit may further indicate an index value. The index value has a correspondence with a frequency domain position of the frequency domain resource group, and the frequency domain position of the frequency domain resource group is indicated by using the index value. The correspondence is predetermined, and the network device and the terminal device have a same understanding of the correspondence. For example, the index value may be an RIV. The RIV needs to be understood as a correspondence between the start position and the length that are of the frequency domain resource group and the index value.

The following describes another indication function of the first indication information.

In the descriptions of this part, the frequency domain resource group refers to a frequency domain resource group in the unavailable frequency domain resource.

Figure 6B:
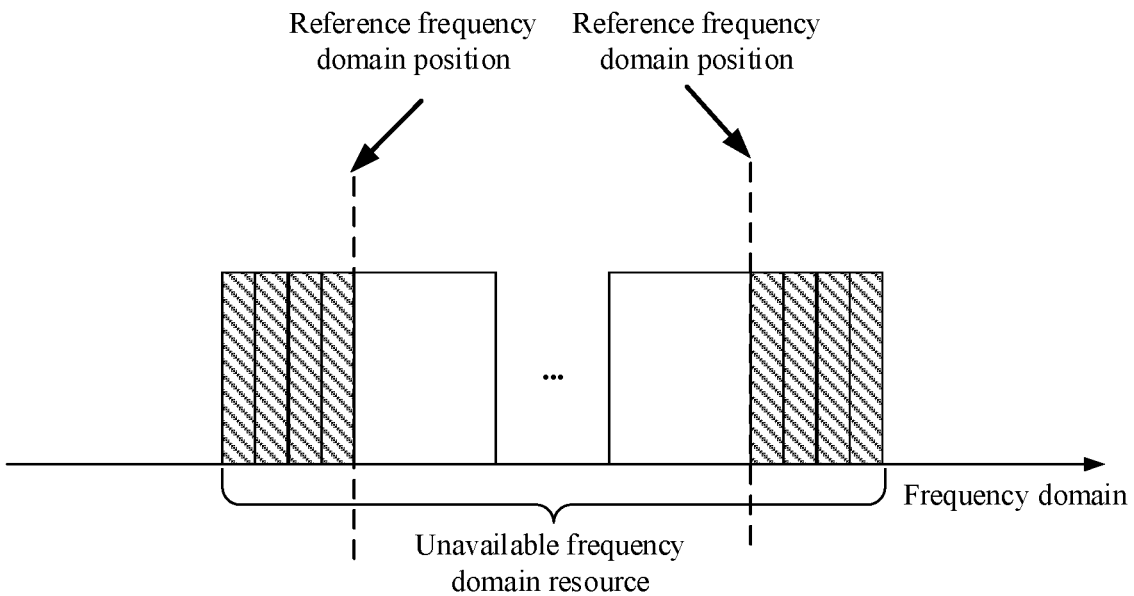
FIG. 6b is a second schematic diagram of a reference frequency domain position according to an embodiment of this application.

As described in the foregoing method, the first indication information indicates the unavailable frequency domain resource in the bandwidth. In one embodiment, the first indication information may further indicate a reference frequency domain position of the frequency domain resource group. If there are a plurality of frequency domain resource groups in the bandwidth, a plurality of pieces of first indication information correspondingly indicate a plurality of reference frequency domain positions, and one piece of first indication information indicates a reference frequency domain position of one frequency domain resource group. The reference frequency domain position includes at least one of a first frequency domain position and a second frequency domain position, the first frequency domain position is higher than the start position of the frequency domain resource group, the second frequency domain position is lower than the end position of the frequency domain resource group, and the second frequency domain position is higher than the first frequency domain position. It should be noted that, that the first frequency domain position is higher than the start position of the frequency domain resource group may be understood as that a frequency corresponding to the first frequency domain position is greater than a frequency corresponding to the $1^{st}$ subcarrier of the $1^{st}$ frequency domain resource block in the frequency domain resource group, and that the second frequency domain position is lower than the end position of the frequency domain resource group may be understood as that a frequency corresponding to the second frequency domain position is less than a frequency corresponding to the last subcarrier of the last frequency domain resource block in the frequency resource group. FIG. 6b shows an example of a reference frequency domain position of one frequency domain resource group. The reference frequency domain position includes a first frequency domain position located at a low frequency side position of the frequency domain resource group and a second frequency domain position located at a high frequency side position of the frequency domain resource group.

In one embodiment, the first indication information directly indicates the reference frequency domain position. For example, the first indication information indicates the reference frequency domain position by using an ARFCN, and one ARFCN corresponds to one absolute frequency. For another example, the first indication information indicates a number of a subcarrier corresponding to the reference frequency position. The number of the subcarrier may be a number for which a common reference point of the bandwidth is used as a reference, and the common reference point may be a reference point A (Point A) in an NR system. It should be understood that, the reference point A is substantially the common reference point, and a name of the reference point A is not limited. Specifically, if the number of the subcarrier of the common reference point is 0, the first indication information may indicate that the subcarrier corresponding to the reference frequency position is X, and X is a positive integer. Therefore, the terminal device may first determine a frequency F1 at which the common reference point is located, and then determine a frequency F2=F1+ X×S at the reference frequency position, where S is a subcarrier spacing, and a value of S may be 15 kHz or another value.

In another embodiment, the first indication information indicates a first offset value between the first frequency domain position and the start position of the frequency domain resource group, or indicates a second offset value between the second frequency domain position and the end position of the frequency domain resource group, or indicates both a first offset value and a second offset value, where values of the first offset value and the second offset value may be equal or not equal. In one embodiment, the first offset value may be in a unit of a subcarrier spacing. Therefore, the first indication information indicates that an offset between the first frequency domain position and the start position of the frequency domain resource group is A subcarrier spacings. The start position of the frequency domain resource group herein needs to be understood as a frequency of the $1^{st}$ subcarrier of the $1^{st}$ frequency domain resource block in the frequency domain resource group, and the subcarrier spacing corresponding to the first offset value may be the same as or different from the subcarrier spacing of the frequency domain resource block. This is not limited herein. For other understanding of the first offset value and the second offset value, refer to related descriptions in the method for indicating the available frequency domain resource. Details are not described again. As shown in FIG. 6b, the first offset value may be considered as a bandwidth of a shadow area at the low frequency position of the frequency domain resource group, and the second offset value may be considered as a bandwidth of a shadow area at the high frequency position of the frequency domain resource group.

When there are a plurality of frequency domain resource groups in the bandwidth, a reference frequency domain position of each frequency domain resource group is indicated by using the first indication information. For example, the first indication information includes a plurality of indication units, and each indication unit corresponds to one frequency domain resource group, and indicates a reference frequency domain position of the corresponding frequency domain resource group. Further, as described above, the representation forms of the first indication information include two embodiments. In one embodiment, the first indication information includes a bit sequence. In this case, the first indication information further includes a plurality of indication units. For ease of description, the indication unit herein is referred to as a second indication unit, and each second indication unit correspondingly indicates a reference frequency domain position of one frequency domain resource group. Correspondingly, the second indication unit directly indicates the reference frequency domain position. For example, the second indication unit indicates the reference frequency domain position by using an ARFCN. Alternatively, the second indication unit indicates one or both of the first offset value and the second offset value.

In another embodiment, the first indication information includes a plurality of first indication units. In this case, the first indication unit further indicates the reference frequency domain position of the frequency domain resource group. Correspondingly, the first indication unit directly indicates the reference frequency domain position. For example, the first indication unit indicates the reference frequency domain position by using an ARFCN. Alternatively, the first indication unit indicates at least one of the first offset value and the second offset value. Specifically, one part of a field in the first indication unit indicates the frequency domain position of the frequency domain resource group, and the other part of the field indicates at least one of the first offset value and the second offset value of the frequency domain resource group.

The first indication information indicates the reference frequency domain position of the frequency domain resource group in the unavailable frequency domain resource, so that the terminal device can more precisely determine the frequency domain position of the available frequency domain resource based on the reference frequency domain position, and can set a narrowband range of filtering based on the reference frequency domain position. Therefore, a bandwidth of a filter can be more flexibly configured, and a requirement on the filter is lowered to some extent.

After determining the unavailable frequency domain resource in the bandwidth, the terminal device does not perform signal sending and receiving on the unavailable frequency domain resource when being scheduled. For operations of the terminal device in some embodiments after the terminal device is scheduled, refer to related descriptions of the available frequency domain resource. Details are not described herein again.

In one embodiment, the terminal device may further determine the unavailable frequency domain resource according to the following method.

First, in the prior art, the network device indicates a reserved resource in the bandwidth of the terminal device by using indication information. The reserved resource is a time-frequency resource on which the terminal device cannot receive the downlink signal. It should be noted that, a frequency domain resource in the reserved resource may be located in the available frequency domain resource, or may be located in the unavailable frequency domain resource. A definition of reserved resource is different from that located in the available frequency domain resource.

Usually, the indication information includes two fields, denoted as a first field and a second field. The first field indicates a frequency domain resource on which the terminal device cannot receive a downlink signal, and the second field indicates a time domain resource on which the terminal device cannot receive a downlink signal. For a manner in which the first field indicates the frequency domain resource on which the terminal device cannot receive the downlink signal, refer to the manner in which the bit sequence indicates the unavailable resource described in the foregoing embodiment.

Based on the foregoing reserved resource indication manner, in an embodiment described in this part, if the first indication information includes only the first field and does not include the second field. In other words, the first indication information includes only a field indicating a frequency domain resource and does not include a resource indicating a time domain resource. In this way, the first field indicates the unavailable frequency domain resource in the bandwidth.

In one embodiment, the terminal device determines whether the first indication information includes the second field; and if the first indication information does not include the second field, the terminal device obtains the first field in the first indication information, and determines the unavailable frequency domain resource in the bandwidth based on the first field.

In one embodiment, the unavailable frequency domain resource indicated by the first field is applicable to uplink communication, downlink communication, or both uplink and downlink communication.

In addition, if the terminal device determines that the first indication information includes the first field and the second field, the terminal device determines, based on the first field, the frequency domain resource on which the terminal device cannot receive the downlink signal, and determines, based on the second field, the time domain resource on which the terminal device cannot receive the downlink signal. It should be noted that the reserved resources indicated herein by using the first field and the second field are only applicable to the downlink communication.

The descriptions of the method shown in FIG. 3 may be applicable to the method shown in FIG. 5. For example, descriptions of another indication function of the first indication information, operations of the terminal device in some embodiments after the terminal device is scheduled, or the like are applicable to the method shown in FIG. 5.

Figure 7:
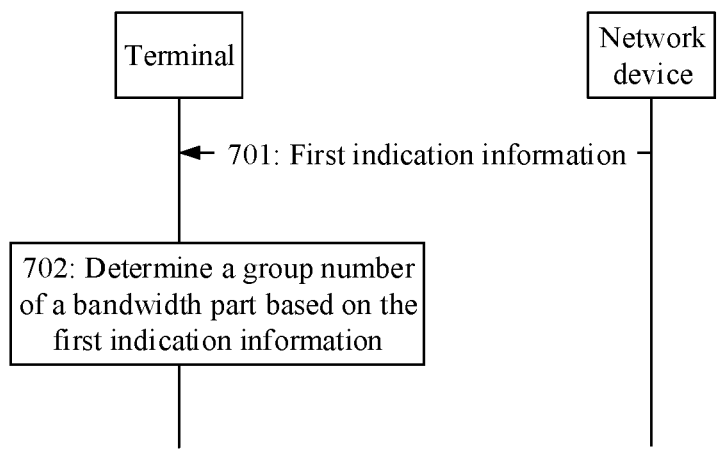
FIG. 7 is a third schematic flowchart of a communication method according to an embodiment of this application.

Based on a same invention concept, as shown in FIG. 7, an embodiment of this application further provides another communication method. An indication information indicates an available frequency domain resource and an unavailable frequency domain resource in a bandwidth. Details are as follows.

Operation 701: A network device sends first indication information to a terminal device, and the terminal device receives the first indication information from the network device.

The first indication information indicates a group number of a bandwidth part (BWP) in a bandwidth.

Operation 702: The terminal device determines the group number of the bandwidth part based on the first indication information.

In the prior art, one bandwidth part includes one or more frequency domain resource blocks, and the network device may send configuration information of the BWP to the terminal device by using higher layer signaling, for example, radio resource control layer signaling, so that the terminal device can obtain a start position of a frequency domain resource block of the BWP, an end position of the frequency domain resource block of the BWP, and a quantity of frequency domain resource blocks of the BWP based on the configuration information. In this embodiment of this application, the first indication information may include one field, and a value in the field indicates a group number of a bandwidth part of a plurality of groups; or the first indication information includes a plurality of fields, and one field indicates a group number of a bandwidth part of a group.

Further, the terminal device determines the available frequency domain resource and/or the unavailable frequency domain resource according to the group number of the bandwidth part. Specifically, a frequency domain resource between bandwidth parts with a same group number is the available frequency domain resource, and a frequency domain resource between bandwidth parts with different group numbers is the unavailable frequency domain resource.

For example, based on FIG. 4a, the network device may preconfigure two bandwidth parts, including a BWP 0 and a BWP 1, for the terminal device. The BWP 0 includes a total of 20 frequency domain resource blocks numbered from 0 to 19, and the BWP 1 includes a total of 22 frequency domain resource blocks numbered from 30 to 51. In this example, the first indication information may indicate that a group number of the BWP 0 is different from that of the BWP 1. For example, the group number of the BWP 0 is 0, and the group number of the BWP 1 is 1. Therefore, the terminal device determines that frequency domain resource blocks between the BWP 0 and the BWP 1 is an unavailable frequency domain resource, and the unavailable frequency domain resource includes a total of 10 frequency domain resource blocks numbered from 20 to 29.

For another example, the network device preconfigures two bandwidth parts, including a BWP 0 and a BWP 1, for the terminal device. The BWP 0 includes a total of six frequency domain resource blocks numbered from 0 to 5, and the BWP 1 includes a total of six frequency domain resource blocks numbered from 14 to 19. In this example, the first indication information may indicate that a group number of the BWP 0 is the same as that of the BWP 1. For example, the group numbers of the BWP 0 and the BWP 1 are both 0. Therefore, the terminal device determines that frequency domain resource blocks between the BWP 0 and the BWP 1 is an available frequency domain resource, that is, a total of eight frequency domain resource blocks numbered 6 to 13 are the available frequency domain resource.

For another example, the network device preconfigures three bandwidth parts, including a BWP 0, a BWP 1, and a BWP 2, for the terminal device. The BWP 0 includes a total of six frequency domain resource blocks numbered from 0 to 5, the BWP 1 includes a total of six frequency domain resource blocks numbered from 14 to 19, and the BWP 2 includes a total of 22 frequency domain resource blocks numbered from 30 to 51. In this example, the first indication information may indicate that group numbers of the BWP 0 and the BWP 1 are the same, but the group numbers of the BWP 0 and the BWP 1 are different from a group number of the BWP 2. For example, the group numbers of the BWP 0 and the BWP 1 are both 0, and the group number of the BWP 2 is 1. Therefore, the terminal device determines frequency domain resource blocks between the BWP 0 and the BWP 1, namely, a total of eight frequency domain resource blocks numbered from 6 to 13, are an available frequency domain resource, while frequency domain resource blocks between BWP 1 and BWP 2, namely, a total of 10 frequency domain resource blocks numbered from 20 to 29, are an unavailable frequency domain resource.

It should be understood that frequency domain resource blocks between bandwidth parts in a same group are the available frequency domain resource, and the unavailable frequency domain resource is included between two bandwidth parts in different groups. It may be further understood that the bandwidth parts in the same group belong to a same frequency domain resource group, and bandwidth parts in different groups do not overlap and belong to different frequency domain resource groups.

For example, the bandwidth includes four bandwidth parts numbered BWP 0, BWP 1, BWP 2, and BWP 3. The BWP 0 and the BWP 1 are bandwidth parts in a same group and belong to a same frequency domain resource group, the BWP 2 and the BWP 3 are bandwidth parts in a same group and belong to a same frequency domain resource group, and the BWP 0, the BWP 1, the BWP 2, and the BWP 3 belong to different groups. In this case, the first indication information may be {0, 0, 1, 1}, or the first indication information has two fields: {0, 0} and {1, 1}. A group number of the BWP 0 is 0, a group number of the BWP 1 is 0, a group number of the BWP 2 is 1, and a group number of the BWP 3 is 1. BWPs with a same group number are BWPs in a same group. In this way, the terminal device may determine the available frequency domain resource and the unavailable frequency domain resource according to the group number of the bandwidth part, and the bandwidth parts in the same group may be processed by using a narrowband filter, thereby avoiding uplink and downlink interference.

In another embodiment, the first indication information includes a plurality of fields, the plurality of fields indicate bandwidth parts of a plurality of groups, and one field indicates a bandwidth part of one group. The bandwidth parts in the same group are contiguous and belong to a same frequency domain resource group, and the bandwidth parts in different groups do not overlap and belong to different frequency domain resource groups. Similarly, in the foregoing example, the first indication information has two fields: {BWP 0, BWP 1} and {BWP 2, BWP 3}. The terminal device may determine, based on the first indication information, that the BWP 0 and the BWP 1 are in a same group, and the BWP 2 and the BWP 3 are in a same group. In this way, the terminal device may determine the available frequency domain resource and the unavailable frequency domain resource according to the group number of the bandwidth part, and the bandwidth parts in the same group may be processed by using a narrowband filter, thereby avoiding uplink and downlink interference.

Figure 8:
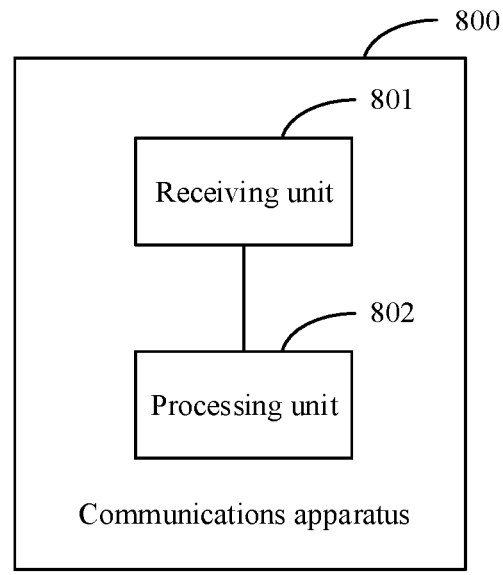
FIG. 8 is a first schematic structural diagram of a communications apparatus according to an embodiment of this application.

Based on a same inventive concept as that in the foregoing method embodiments, as shown in FIG. 8, an embodiment of this application further provides a communications apparatus 800. The communications apparatus 800 is configured to perform operations performed by the terminal device in the foregoing method embodiments. The communications apparatus 800 includes a receiving unit 801 and a processing unit 802. The receiving unit 801 is configured to receive information, or a signal, or data from a network device. The processing unit 802 is configured to perform another operation, other than operations of signal receiving and sending, performed by the terminal device described in the foregoing method embodiments. No repeated description is provided.

Figure 9:
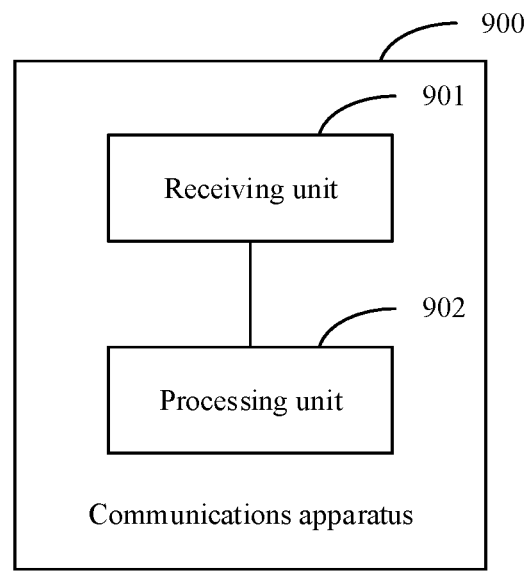
FIG. 9 is a second schematic structural diagram of a communications apparatus according to an embodiment of this application.

Based on a same inventive concept as that in the foregoing method embodiments, as shown in FIG. 9, an embodiment of this application further provides a communications apparatus 900. The communications apparatus 900 is configured to perform operations performed by the network device in the foregoing method embodiments. The communications apparatus 900 includes a sending unit 901 and a processing unit 902. The sending unit 901 is configured to send information, or a signal, or data to a terminal device. The processing unit 902 is configured to perform another operation, other than operations of signal receiving and sending, performed by the network device described in the foregoing method embodiments. No repeated description is provided.

Figure 10:
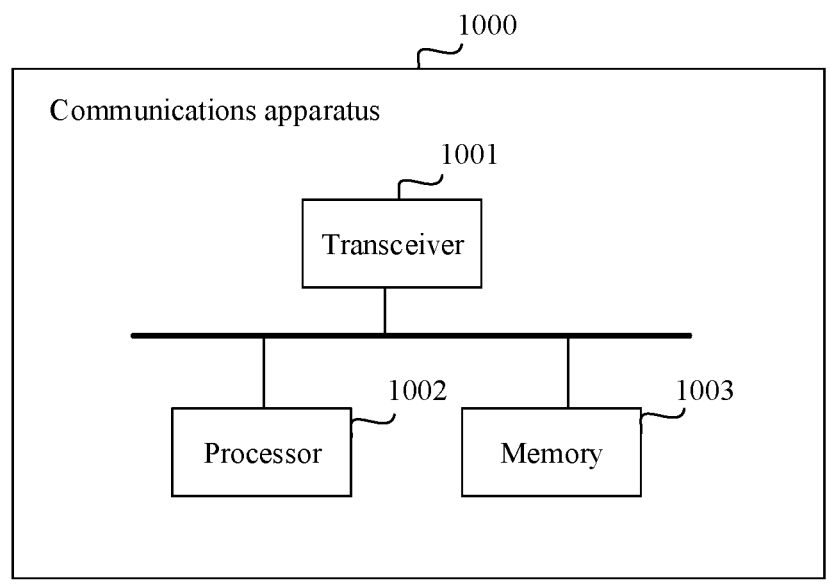
FIG. 10 is a third schematic structural diagram of a communications apparatus according to an embodiment of this application.

Based on a same inventive concept as that of the foregoing communication methods, as shown in FIG. 10, an embodiment of this application further provides a communications apparatus 1000. The communications apparatus 1000 includes a transceiver 1001, a processor 1002, and a memory 1003. The memory 1003 is optional. The memory 1003 is configured to store a program executed by the processor 1002. When the communications apparatus 1000 is configured to implement operations performed by the terminal device in the communication methods provided in the foregoing embodiments, the processor 1002 is configured to invoke a group of programs. When the programs are executed, the processor 1002 is enabled to perform operations performed by the terminal device in one of the communication methods provided in the foregoing embodiments. A functional module, the receiving unit 801, in FIG. 8 may be implemented by using the transceiver 1001, and the processing unit 802 may be implemented by using the processor 1002. When the communications apparatus 1000 is configured to implement operations performed by the network device in the communication methods provided in the foregoing embodiments, the processor 1002 is configured to invoke a group of programs. When the programs are executed, the processor 1002 is enabled to perform operations performed by the network device in one of the communication methods provided in the foregoing embodiments. A functional module, the sending unit 901, in FIG. 9 may be implemented by using the transceiver 1101, and the processing unit 902 may be implemented by using the processor 1102.

The processor 1002 may be a central processing unit (CPU), a network processor (NP), or a combination of the CPU and the NP.

The processor 1002 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), generic array logic (generic array logic, GAL), or any combination thereof.

The memory 1003 may include a volatile memory, for example, a random access memory (RAM). The memory 1003 may also include a non-volatile memory, for example, a flash memory, a hard disk drive (HDD), or a solid-state drive (SSD). The memory 1003 may further include a combination of the foregoing types of memories.

In the communication methods provided in the foregoing embodiments of this application, some or all of the described operations and functions performed by the terminal device and the network device may be implemented by using a chip or an integrated circuit.

To implement the functions of the apparatus in FIG. 8, FIG. 9, or FIG. 10, an embodiment of this application further provides a chip, including a processor, and configured to support the apparatus in implementing the functions related to the terminal device and the network device in the communication methods provided in the foregoing embodiments. In one embodiment, the chip is connected to a memory or the chip includes a memory, and the memory is configured to store a program instruction and data that are necessary for the apparatus.

An embodiment of this application provides a computer storage medium. The computer storage medium stores a computer program, and the computer program includes an instruction used to perform the communication methods provided in the foregoing embodiments.

An embodiment of this application further provides a computer program product including an instruction. When the instruction is run on a computer, the computer is enabled to perform the communication methods provided in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operation operations are performed on the computer or another programmable device, thereby generating computer-implemented processing. Therefore, the instructions executed on the computer or another programmable device provide operations for implementing a specific function in one or more processes in the flowcharts and/or in one or more blocks in the block diagrams.

Although some embodiments of this application have been described, once learning of the basic inventive concept, a person skilled in the art can make additional changes and modifications to these embodiments. Therefore, the following claims are intended to be construed as to cover the embodiments and all changes and modifications falling within the scope of this application.

Clearly, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A communication method, comprising:
receiving first indication information, wherein the first indication information indicates guard bands in a bandwidth, wherein the bandwidth includes one carrier bandwidth or one carrier bandwidth part, wherein the guard bands comprise N non-contiguous frequency domain resource groups, and wherein each frequency domain resource group comprises one or more contiguous frequency domain resource blocks; and
determining the guard bands and an available frequency domain resource in the bandwidth based on the first indication information, the available frequency domain resource in the bandwidth are frequency domain resource in the bandwidth except the guard bands;
wherein the first indication information comprises N first indication units, the N first indication units respectively indicate the N frequency domain resource groups and N is a positive integer greater than 1, wherein each first indication of the N first indication units indicates starting positions of the frequency domain resource blocks of the corresponding frequency domain resource group, and indicates a length of the frequency domain resource blocks of the corresponding frequency domain resource group.

2. The method according to claim 1, further comprising:
receiving second indication information, wherein the second indication information indicates a downlink resource; and
receiving downlink signal on an available downlink frequency domain resource, wherein the available downlink frequency domain resource is a resource that belongs to the available frequency domain resource and belongs to the downlink resource.

3. The method according to claim 1, further comprising:
receiving second indication information, wherein the second indication information indicates a downlink resource; and receiving a downlink signal on an available downlink frequency domain resource block, wherein the available downlink frequency domain resource block includes a resource block belonging to the available frequency domain resource and the downlink resource; or
receiving third indication information, wherein the third indication information indicates an uplink resource; and sending an uplink signal on an available uplink frequency domain resource block, wherein the available uplink frequency domain resource block includes a resource block belonging to the guard bands and the uplink resource.

4. The method according to claim 3, wherein if the available downlink frequency domain resource block is located in the plurality of frequency domain resource groups, the method further comprises receiving the downlink signal on the plurality of frequency domain resource groups using a plurality of radio frequency units; or if the available uplink frequency domain resource block is located in the plurality of frequency domain resource groups, the method further comprises sending the uplink signal on the plurality of frequency domain resource groups using a plurality of radio frequency units;
Wherein the plurality of radio frequency units correspond to the plurality of frequency domain resource groups.

5. A communication method, comprising:
generating first indication information; and
sending the first indication information, wherein
the first indication information indicates guard bands in a bandwidth, wherein the bandwidth includes one carrier bandwidth or one carrier bandwidth part, wherein the guard bands comprise N non-contiguous frequency domain resource groups, and wherein each frequency domain resource group comprises one or more contiguous frequency domain resource blocks, wherein the first indication information is used by a terminal device to determine the guard bands and an available frequency domain resource in the bandwidth based on the first indication information, the available frequency domain resource in the bandwidth are frequency domain resource in the bandwidth except the guard bands,
wherein the first indication information comprises N first indication units, the N first indication units respectively indicate the N frequency domain resource groups and N is a positive integer greater than 1, wherein each first indication of the N first indication units indicates starting positions of the frequency domain resource blocks of the corresponding frequency domain resource group, and indicates a length of the frequency domain resource blocks of the corresponding frequency domain resource group.

6. The method according to claim 5, further comprising:
generating second indication information indicating a downlink resource; and
sending the second indication information; and
sending downlink signal on an available downlink frequency domain resource, wherein the available downlink frequency domain resource is a resource that belongs to the available frequency domain resource and belongs to the downlink resource.

7. The method according to claim 5, further comprising:
generating second indication information that indicates a downlink resource; and
sending the second indication information; and
sending a downlink signal on an available downlink frequency domain resource block, wherein the available downlink frequency domain resource block includes a resource block belonging to the available frequency domain resource and the downlink resource; or
generating third indication information that indicates an uplink resource; and
sending the third indication information; and
receiving uplink signal on an available uplink frequency domain resource, wherein the available uplink frequency domain resource is a resource that belongs to the available frequency domain resource and belongs to the uplink resource.

8. The method according to claim 7,
wherein if the available downlink frequency domain resource block is located in the plurality of frequency domain resource groups, the method further comprises: sending the downlink signal on the plurality of frequency domain resource groups using a plurality of radio frequency units; or if the available uplink frequency domain resource block is located in the plurality of frequency domain resource groups, the method further comprises: receiving the uplink signal on the plurality of frequency domain resource groups using a plurality of radio frequency units;
wherein the plurality of radio frequency units correspond to the plurality of frequency domain resource groups.

9. A communications apparatus, comprising:
a processor coupled to a memory to invoke a program in the memory, which when executed by the processor, causes the communications apparatus to:
receive first indication information, wherein the first indication information indicates guard bands in a bandwidth, wherein the bandwidth includes one carrier bandwidth or one carrier bandwidth part, wherein the guard bands comprise N non-contiguous frequency domain resource groups, and wherein each frequency domain resource group comprises one or more contiguous frequency domain resource blocks; and
determine the guard bands and an available frequency domain resource in the bandwidth based on the first indication information, wherein the available frequency domain resource in the bandwidth is a frequency domain resource in the bandwidth except the guard bands;
wherein the first indication information comprises N first indication units, the N first indication units respectively indicate the N frequency domain resource groups and N is a positive integer greater than 1, wherein each first indication of the N first indication units indicates starting positions of the frequency domain resource blocks of the corresponding frequency domain resource group, and indicates a length of the frequency domain resource blocks of the corresponding frequency domain resource group.

10. The communications apparatus according to claim 9, wherein the program in the memory, which when executed by the processor, further cause the communications apparatus to:
receive second indication information, the second indication information indicates downlink resource; and
receive downlink signal on available downlink frequency domain resource, wherein the available downlink frequency domain resource is a resource that belongs to the available frequency domain resource and belongs to the downlink resource.

11. The communications apparatus according to claim 9, wherein the program further causes the communications apparatus to:
receive second indication information, wherein the second indication information indicates a downlink resource; and receive a downlink signal on an available downlink frequency domain resource block, wherein the available downlink frequency domain resource block includes a resource block belonging to the available frequency domain resource and the downlink resource; or
receive third indication information, wherein the third indication information indicates an uplink resource; and send an uplink signal on an available uplink frequency domain resource block, wherein the available uplink frequency domain resource block includes a resource block belonging to the guard bands and the uplink resource.

12. The communications apparatus according to claim 11, wherein if the available downlink frequency domain resource block is located in the plurality of frequency domain resource groups, the program further causes the communications apparatus to receives the downlink signal on the plurality of frequency domain resource groups using a plurality of radio frequency units; or if the available uplink frequency domain resource block is located in the plurality of frequency domain resource groups, the program further causes the communications apparatus to sends the uplink signal on the plurality of frequency domain resource groups using a plurality of radio frequency units;
   wherein the plurality of radio frequency units correspond to the plurality of frequency domain resource groups.

13. A communications apparatus, comprising:
a processor coupled to a memory to invoke a program in the memory, which when executed by the processor, causes the communications apparatus to:
generate first indication information; and
send the first indication information, wherein
the first indication information indicates guard bands in a bandwidth, wherein the bandwidth includes one carrier bandwidth or one carrier bandwidth part, wherein the guard bands comprise N non-contiguous frequency domain resource groups, and wherein each frequency domain resource group comprises one or more contiguous frequency domain resource blocks, wherein the first indication information is used to determine the guard bands and an available frequency domain resource in the bandwidth based on the first indication information, the available frequency domain resource in the bandwidth is a frequency domain resource in the bandwidth except the guard bands,
   wherein the first indication information comprises N first indication units, the N first indication units respectively indicate the N frequency domain resource groups and N is a positive integer greater than 1, wherein each first indication of the N first indication units indicates starting positions of the frequency domain resource blocks of the corresponding frequency domain resource group, and indicates a length of the frequency domain resource blocks of the corresponding frequency domain resource group.

14. The communications apparatus according to claim 13, wherein the program in the memory, which when executed by the processor, further causes the communications apparatus to:
   generate second indication information, the second indication information indicating a downlink resource;
   send the second indication information; and
   send second downlink signal on an available downlink frequency domain resource, wherein the available downlink frequency domain resource is a resource that belongs to the available frequency domain resource and belongs to the downlink resource.

15. The communications apparatus according to claim 13, wherein the program in the memory, which when executed by the processor, further cause the communications apparatus to:
   generate second indication information that indicates a downlink resource; and
   send the second indication information; and
   send a downlink signal on an available downlink frequency domain resource block, wherein the available downlink frequency domain resource block includes a resource block belonging to the available frequency domain resource and the downlink resource; or
   generate third indication information that indicates an uplink resource; and
   send the third indication information; and
   receive uplink signal on an available uplink frequency domain resource, wherein the available uplink frequency domain resource is a resource that belongs to the available frequency domain resource and belongs to the uplink resource.

16. The communications apparatus according to claim 15, wherein if the available downlink frequency domain resource block is located in the plurality of frequency domain resource groups, the communications apparatus is to send the downlink signal on the plurality of frequency domain resource groups using a plurality of radio frequency units; or if the available uplink frequency domain resource block is located in the plurality of frequency domain resource groups, the communications apparatus is to receive the uplink signal on the plurality of frequency domain resource groups using a plurality of radio frequency units;
   wherein the plurality of radio frequency units correspond to the plurality of frequency domain resource groups.

\* \* \* \* \*